United States Patent [19]

Amadon et al.

[11] Patent Number: 5,301,223
[45] Date of Patent: Apr. 5, 1994

[54] CELLULAR TELEPHONE SYSTEM WITH REMOTE PROGRAMMING, VOICE RESPONSIVE REGISTRATION AND REAL TIME BILLING

[75] Inventors: Charles G. Amadon, Seattle; Rick F. Combest, Winslow; David M. Stanhope, Tacoma; Cameron S. Elliott, Seattle, all of Wash.

[73] Assignee: Cellular Technical Services Company, Inc., Seattle, Wash.

[21] Appl. No.: 934,308

[22] Filed: Aug. 25, 1992

Related U.S. Application Data

[63] Continuation of Ser. No. 603,166, Oct. 25, 1990, abandoned, which is a continuation-in-part of Ser. No. 527,136, May 22, 1990, abandoned.

[51] Int. Cl.$^5$ .................. H04M 11/00; H04M 15/00; H04Q 7/00
[52] U.S. Cl. .......................................... 379/58; 379/59; 379/63; 379/91; 379/112; 455/33.1
[58] Field of Search ................... 379/56, 58, 59, 60, 379/62, 91, 112, 114, 130, 144, 63; 455/33.1

[56] References Cited

U.S. PATENT DOCUMENTS

| | | | |
|---|---|---|---|
| 3,725,947 | 4/1973 | Albertini et al. | 379/114 |
| 3,808,537 | 4/1974 | Sarati et al. | |
| 4,515,994 | 5/1985 | Bolle et al. | |
| 4,640,986 | 2/1987 | Yotsutani et al. | 379/60 |
| 4,776,000 | 10/1988 | Parienti | 379/62 |
| 4,776,003 | 10/1988 | Harris | 379/91 |
| 4,777,646 | 10/1988 | Harris | 379/91 |
| 4,831,647 | 5/1989 | D'Avello et al. | 379/91 |
| 4,833,702 | 5/1989 | Shitara et al. | |
| 4,860,341 | 8/1989 | D'Avello et al. | 379/91 |
| 4,935,956 | 6/1990 | Hellwarth et al. | |
| 4,945,556 | 7/1990 | Namekawa | 379/58 |
| 4,951,308 | 8/1990 | Bishop et al. | 379/91 |
| 4,958,368 | 9/1990 | Parker | 379/91 |
| 4,965,821 | 10/1990 | Bishop et al. | 379/91 |
| 4,975,942 | 12/1990 | Zebryk | 379/144 |
| 4,979,207 | 12/1990 | Baum et al. | 379/112 |
| 5,016,269 | 5/1991 | Rogers | 379/59 |
| 5,027,388 | 6/1991 | Bradshaw et al. | 379/112 |
| 5,046,082 | 9/1991 | Zicker | 379/59 |
| 5,054,110 | 10/1991 | Comroe et al. | 455/33 |
| 5,095,500 | 3/1992 | Tayloe et al. | 379/32 |
| 5,109,403 | 4/1992 | Sutphin | 379/59 |

FOREIGN PATENT DOCUMENTS

| | | | |
|---|---|---|---|
| 01226266 | 9/1989 | Japan | 379/58 |
| 0054636 | 2/1990 | Japan | 379/63 |

OTHER PUBLICATIONS

Svigals, J., "Low Cost Point-of-Sale Terminal", IBM Technical Disclosure Bulletin vol. 25, #4 Sep. 1982.

(List continued on next page.)

Primary Examiner—Wing F. Chan
Assistant Examiner—William D. Cumming
Attorney, Agent, or Firm—Graybeal Jackson Haley & Johnson

[57] ABSTRACT

Method and apparatus for use in a mobile telephone rental system in which credit card information is communicated between the mobile telephone unit 100 and a Voice Response System 302 for customer registration and remote programming of mobile telephone unit 100 features and NAM settings; communicating data between the Voice Response System 302 and a Registration System 304 for customer credit card validation; communicating data between the Registration System 304 and a credit card clearinghouse 306 for credit card approval or decline; communicating data between the Registration System 304 and a plurality of Collector Systems 307 for call rating and billing; communicating data between the Registration System 304 and an Administration System 309 for providing rated call information to the reseller; and communicating data between the mobile telephone unit 100 and an Indirect System 303 for establishing service in cellular areas without Collector System 307 service. Data read from the mobile telephone units 100 are transmitted in variable length, encrypted and error protected Packet Data Units (PDUs).

8 Claims, 23 Drawing Sheets

OTHER PUBLICATIONS

Cellular Technical Services Company, "Introducing Real Time Billing", 1988.
Subscriber Computing, Incorporated "Company Profile, Cellular", Jan. 1990.
Telephony, "Railroad Riders Can Now Make and Get Calls on Train", vol. 176 #5-Feb. 1, 1969.
Cellular Technical Services Co. Brochure entitled "Breakthrough for Cellular Carriers: Turn Your Escaping Minutes into Profits!" (limited distribution, Jan. 1989).
Tranz 330 Installation Guide, published by VeriFone, Inc. Technical Publications Group, 100 Kahelu Ave., Mililani, Hawaii 96789 (published Feb. 1990, 16 pages).
"The Cellular Connection" by Josef Bernard Quantum Publishing, Inc. 4th Ed. Apr. 1990.

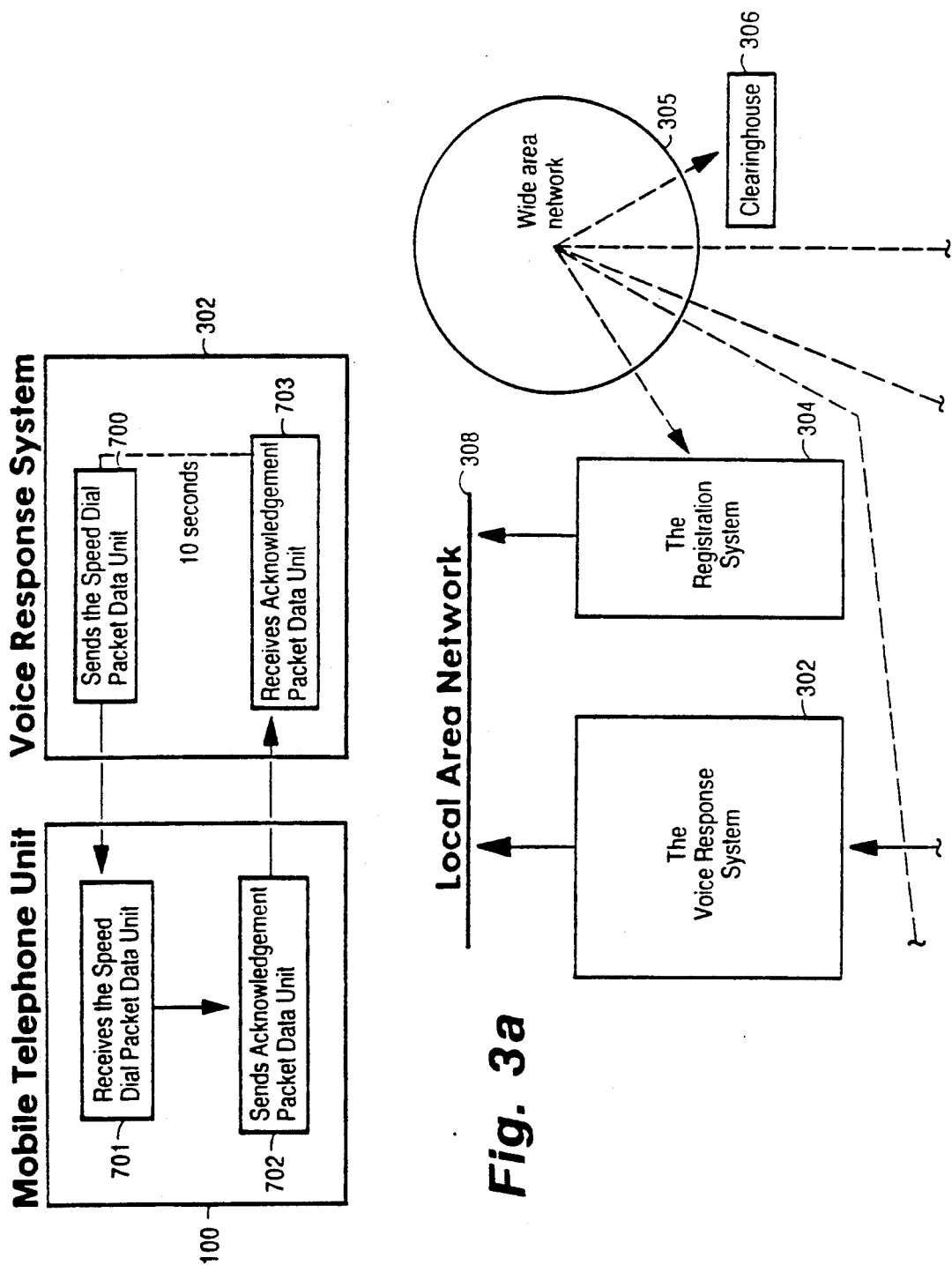

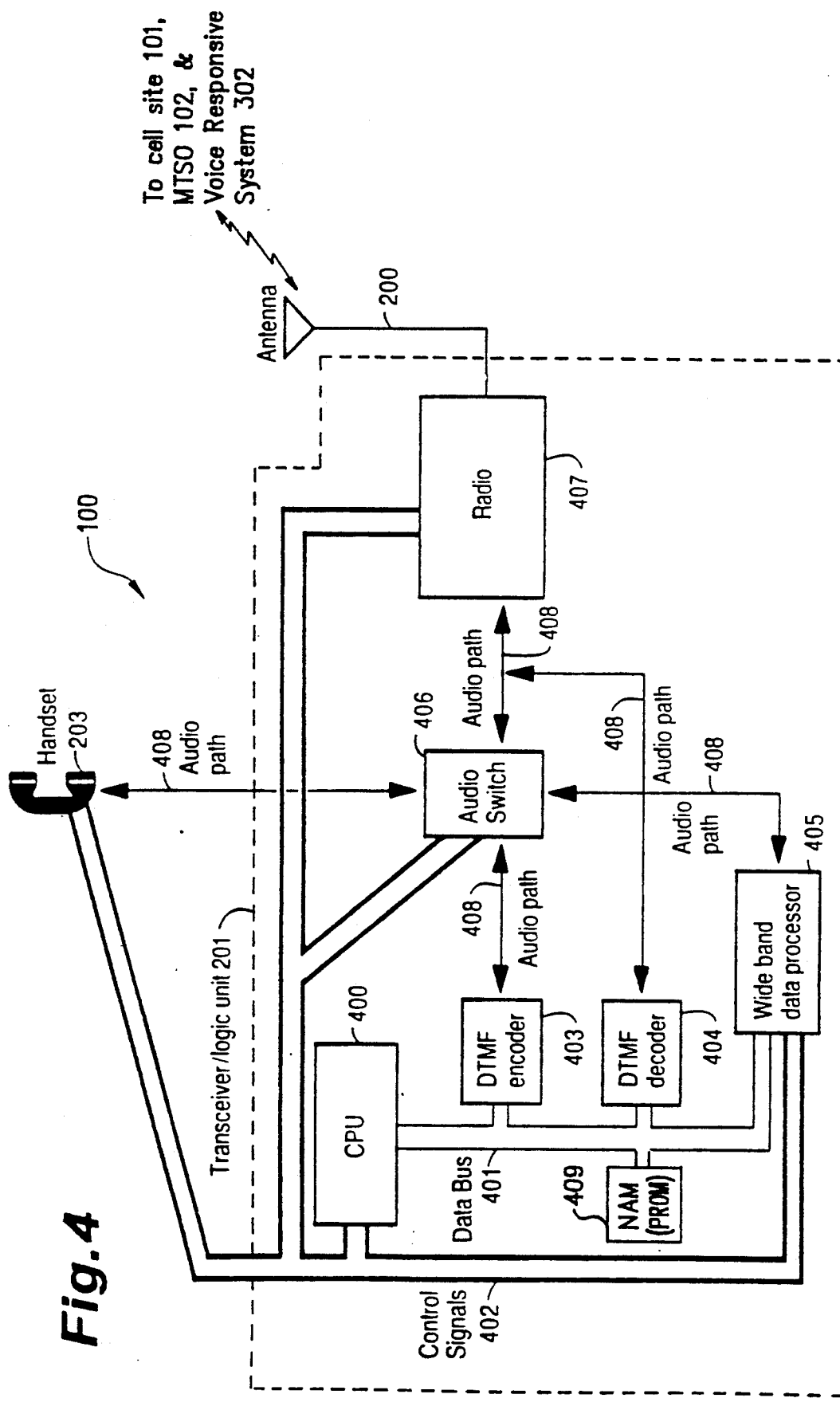

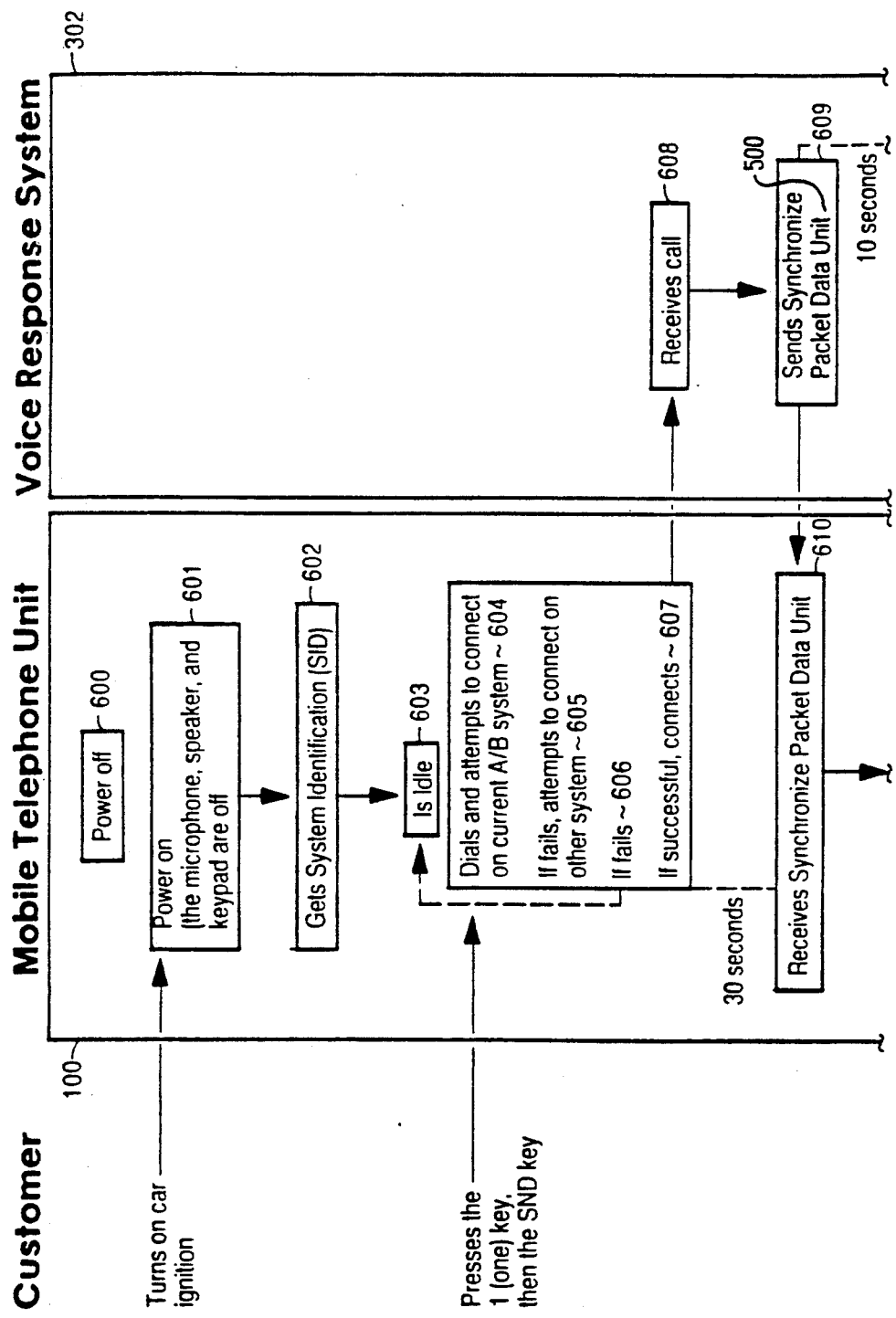

CELLULAR TELEPHONE SYSTEM WITH REMOTE PROGRAMMING, VOICE RESPONSIVE REGISTRATION AND REAL TIME BILLING

CROSS REFERENCE TO RELATED APPLICATION

This application is a continuation of application Ser. No. 07/603,166, now abandoned, filed Oct. 25, 1990, now abandoned, the benefit of the filing dates of which are hereby claimed under 35 USC 120, which is a continuation-in-part of copending U.S. patent application Ser. No. 07/527,136, entitled "Real Time Cellular Phone Rental System and Method," filed May 22, 1990, which is now abandoned and continued in the U.S. national designation of a PCT application, Ser. No. PCT/US 91/03583, filed May 21, 1991, and is based on PCT application Serial No. PCT/US90/05736, filed Oct. 6, 1990, and entitled Cellular Telephone System With Remote Programming, Voice Responsive Registration, and Real Time Billing.

BACKGROUND OF THE INVENTION

1. Field of the Invention

This invention relates generally to mobile radiotelephone systems and specifically to the method and apparatus used in a system installed in rental vehicles, utilizing a computer system for credit card approval, call monitoring, call rating, and billing.

2. Description of the Prior Art

Widespread mobile telephone unit service enables large numbers of users to have cellular mobile telephone service in their vehicles. To provide this service in rental vehicles or to other public transportation services such as taxi cabs, limousines, buses, and railroads, certain issues must be addressed by the entities providing the service; the transmission of voice messages through the mobile telephone unit to the customer to obtain credit card information as part of a registration process; the activation and deactivation of the mobile telephone unit, based on a customer's approved or denied credit; the activation and deactivation of the mobile telephone, based on a customer's wishes; the supervision of the mobile telephone unit as it pertains to cellular system identification, cellular airtime limits, and cellular service areas outside of the said service; the supervision of incoming calls to the mobile telephone unit; and the billing of a customer's accumulated cellular airtime.

Prior systems used for supervision of mobile telephone units in rental vehicles, as disclosed in U.S. Pat. Nos. 4,776,003; 4,777,646; 4,831,647; and 4,860,341, have employed credit card actuatable mobile telephone units—that is, mobile telephone units with a magnetic stripe readers. A customer must run a credit card through the magnetic stripe reader so the credit card may be identified. A call is then placed, through the mobile telephone unit, to a registration system which calls a credit card clearinghouse for credit card validation. If there is no reason for service to be denied, the mobile telephone unit is activated for the customer to make calls until he turns off the vehicle's ignition or turns off the mobile telephone unit's power.

Data with respect to customers' calls are conventionally stored on nine track computer tapes in Automated Message Accounting (AMA) format. These AMA tapes are sent by the cellular service reseller to a service bureau and processed so the reseller may receive the billing information needed. The service bureau sends the billing information on nine track data tapes (typically in up to a month's time), which the reseller receives and uses to bill customers.

The disadvantages of this mode of operation are shared by the customer, the cellular service reseller, and the rental vehicle owner: the customer must swipe his credit card through the unit again when he turns off and again turns on the vehicle's ignition or the mobile telephone unit's power and the customer receives no receipt for his or her transactions at the end of the mobile telephone service; the cellular service reseller must wait up to thirty days to receive the billing information stored on the reseller tapes; and the rental vehicle owner loses money on the installed mobile telephone unit investment because the mobile telephone unit, equipped with the magnetic stripe reader, cannot be sold with the vehicle so equipped.

Summary of the Invention

One object and feature of the present invention is to provide billing information to a reseller in real time, allowing the reseller to bill on a daily basis. Billing data is available for receipts as soon as the customer ends the mobile telephone unit service.

Another object and feature of the present invention is to provide a way for the customer to continue to use the mobile telephone unit when the power to the vehicle or to the mobile telephone unit has been turned off and turned back on, without re-initiating the registration process.

Another object and feature of the present invention is to allow the customer to provide credit card information such as credit card number and expiration date through the mobile telephone unit without a magnetic stripe reader. This type of mobile telephone unit may be readily converted to a mobile telephone unit programmed to function outside of the rental market, enabling the rental vehicle owner to sell the mobile telephone unit with the vehicle. The conversion takes place through remote programming of the mobile telephone unit by a touch tone transport system.

Another object and feature of the present invention is to provide and maintain speed dialing capabilities to the mobile telephone unit. Speed dial numbers are programmed into the mobile telephone unit remotely, through a touch tone transport system. Changing and adding speed dial numbers also occurs through this remote programming.

Another object and feature of the present invention is to program a mobile telephone unit's lock code remotely. This occurs over the voice channel through a touch tone transport system.

Accordingly, these and other objects and features are achieved by the present invention, which encompasses the method and apparatus used in a system installed in rental vehicles, utilizing a computer system to contact a credit card clearing house for credit card approval, and utilizing a computer system to monitor calls, to rate calls, and to bill calls in real time. The customer enters credit card information through a voice prompted registration process. After credit is approved for a predetermined amount, the customer is prompted to enter a six digit personal activation code which supervises access to the mobile telephone unit. Each time the vehicle is turned off and on, the customer must enter his personal activation code to unlock the mobile telephone unit thereby allowing him to make and receive calls.

The customer's calls are rated by the system and the rated call information is shipped in real time to a computer system responsible for creating billing drafts to be submitted to the customer's credit card provider. Billing may be generated on a daily basis.

When the rental vehicle agency eventually sells the vehicle and the installed mobile telephone unit, a process is initiated in the said system to convert the mobile telephone unit to a mobile telephone unit programmed to function outside the rental market. A mobile telephone unit control bit in the mobile telephone unit's Numeric Assignment Module (NAM) controls the status of the mobile telephone unit. Through remote re-programming of the NAM, the mobile telephone unit is converted to function outside of the present invention.

The above and other objects, features, and advantages of the present invention will become apparent upon consideration of the following detailed description of certain preferred embodiments thereof, taken in conjunction with the accompanying drawings.

BRIEF DESCRIPTION OF THE DRAWINGS

FIGS. 3a, 3b, and 3c are a composite block diagram showing the interaction of components in a system governing the use of mobile telephone units installed in rental vehicles.

FIG. 4 is a block diagram of the transceiver/logic unit of the mobile telephone unit used in practice of the present invention.

FIGS. 6a and 6b are a composite state transition diagram showing the states and state changes that occur when the mobile telephone unit's power is activated and the customer initiates a registration process.

FIG. 7 is a state transition diagram showing the Packet Data Unit exchange occurring when the mobile telephone unit is programmed for speed dialing numbers.

DESCRIPTION OF THE PREFERRED EMBODIMENTS

Figure 1:
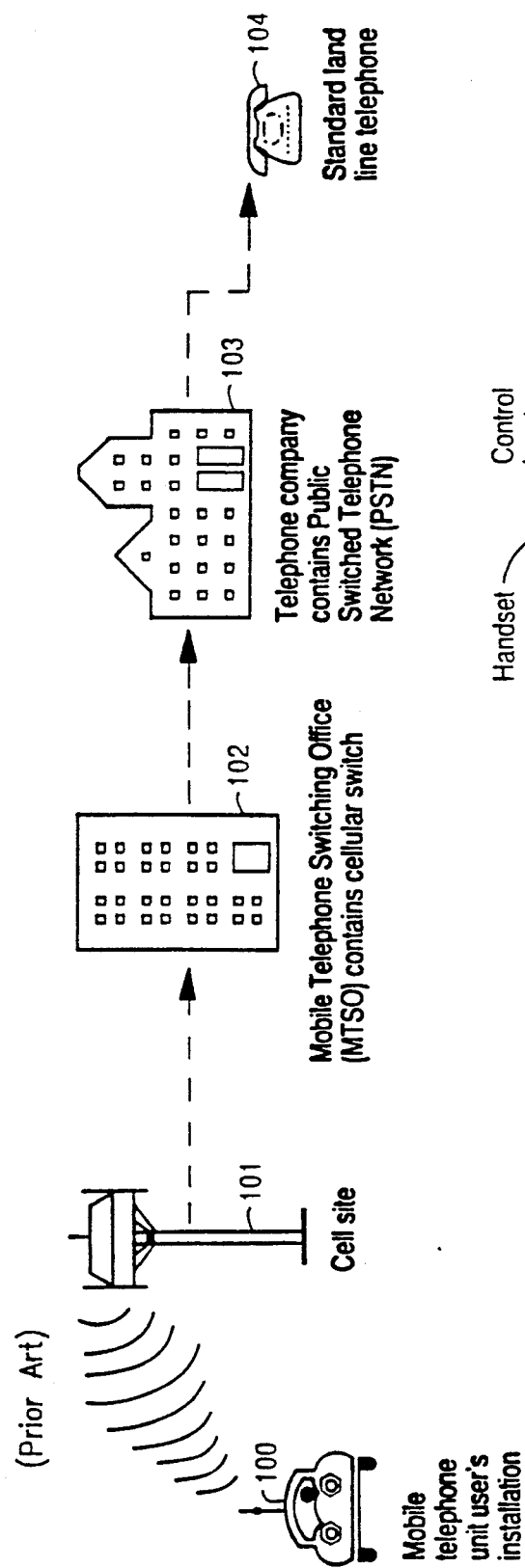
FIG. 1 is a schematic diagram showing the path of a call made on a mobile telephone unit installed in a vehicle.

A greatly simplified illustration of the general operation of conventional cellular mobile telephone service—a standard path of a cellular mobile telephone unit call—is shown in FIG. 1. A mobile telephone unit 100 is installed in a vehicle.

The mobile telephone unit user makes a call within radio transmission and reception range of a cell site 101 which includes a fixed radio receiver and transmitter. All the cell sites belonging to a particular cellular system are connected together at a Mobile Telephone Switching Office (MTSO) 102, which ties them into a conventional land line telephone system. Thus, the mobile telephone user's call travels through a cell site 101 to a MTSO 102 to a Public Switched Telephone Network (PSTN) 103. The PSTN is responsible for linking the call made on the mobile telephone unit to a standard, land line telephone 104.

Figure 2:
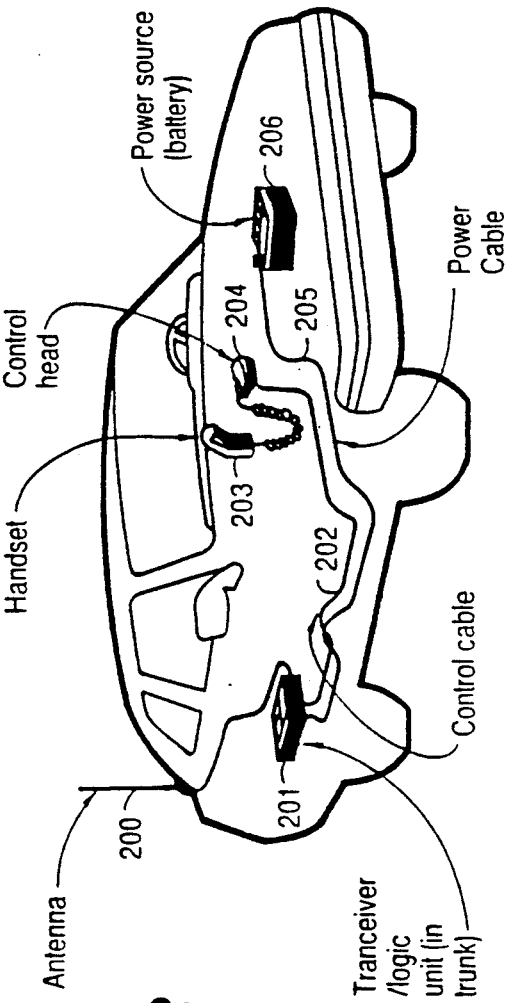
FIG. 2 is a diagram of a typical installation of a mobile telephone unit in a vehicle.

The mobile telephone unit 100 contains components that supervise its operation. FIG. 2 is an illustration of a typical, conventional installation of a mobile telephone unit in a vehicle. The antenna 200 is necessary for the mobile telephone unit 100 to transmit and receive signals from a cell site 101. The transceiver/logic unit 201, typically installed in the vehicle's trunk, is the core of the mobile telephone unit 100. The transceiver/logic unit 201 is a radio transmitter and receiver that communicates with the equipment at a cell site 101 to establish a connection, to determine the radio frequencies used for transmission and reception, and to coordinate transfers from one cell site 101 to another. A detailed diagram of a transceiver/logic unit usable in practice of the present invention is FIG. 4.

The handset 203 may be compared to the receiver of a standard, land line telephone 104 as it used for dialing and receiving calls. Externally, the mobile telephone handset 203 is of a configuration conventional per se, such as shown and described in "The Cellular Connection," by Josef Bernard, published by Quantum Publishing, Inc. of Mendocino, Calif. (September 1987), at pages 48-55.

The mobile telephone unit user lifts the handset 203 and speaks or leaves the handset 203 in the hang-up cup and presses a key on the handset 203 for hands-free conversation. The control head 204 issues commands to the other components of the mobile telephone unit 100 and to the equipment at a cell site 101. The control head 204 is connected to the transceiver/logic unit 201 by the control cable 204. The power source 206 supplies power to the mobile telephone unit 100. The vehicle's battery is typically used as the power source 206 of the mobile telephone unit 201. The power source 206 is connected to the transceiver/logic unit 201 by the power cable 205.

Figure 3B:
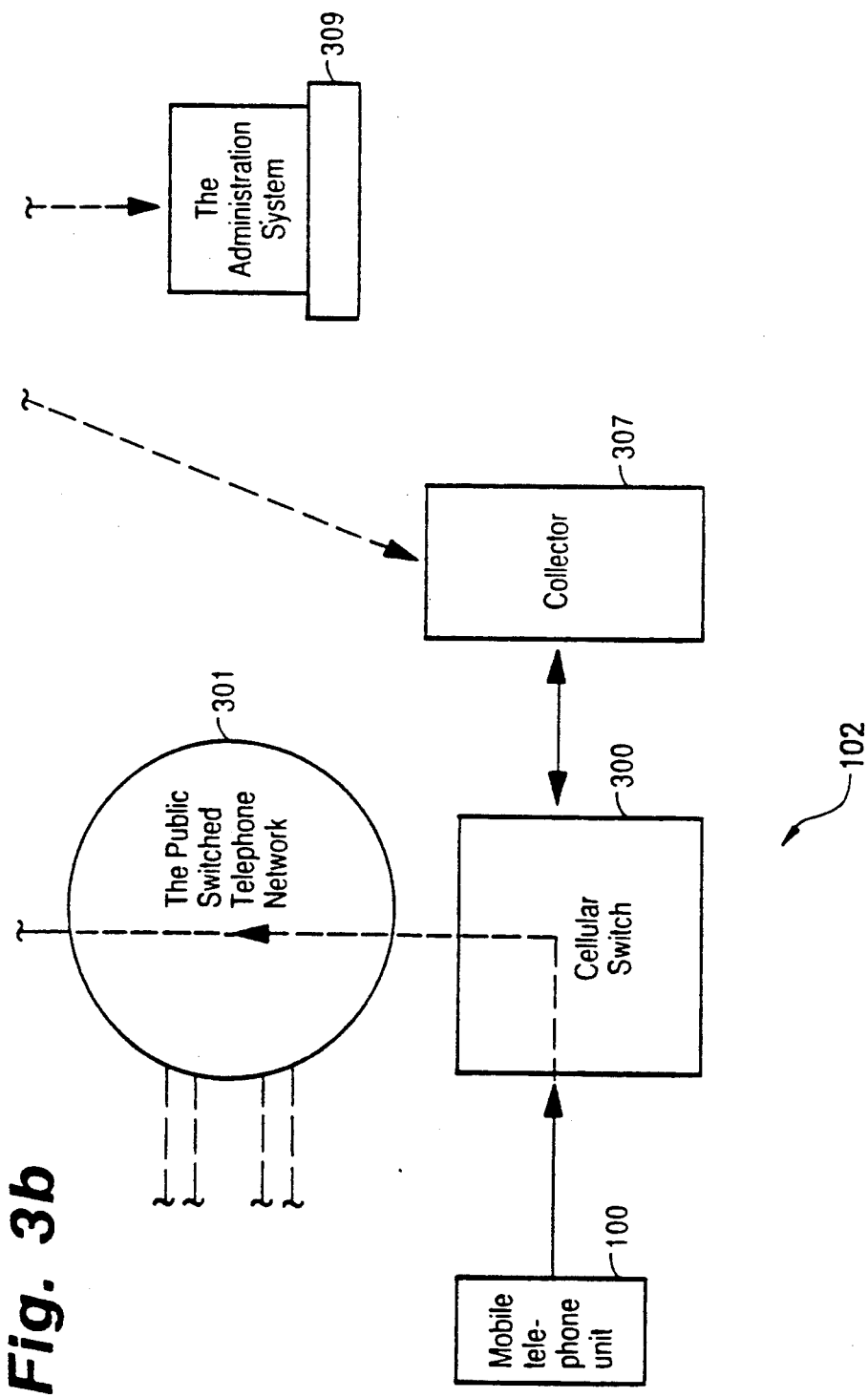
Figure 3C:
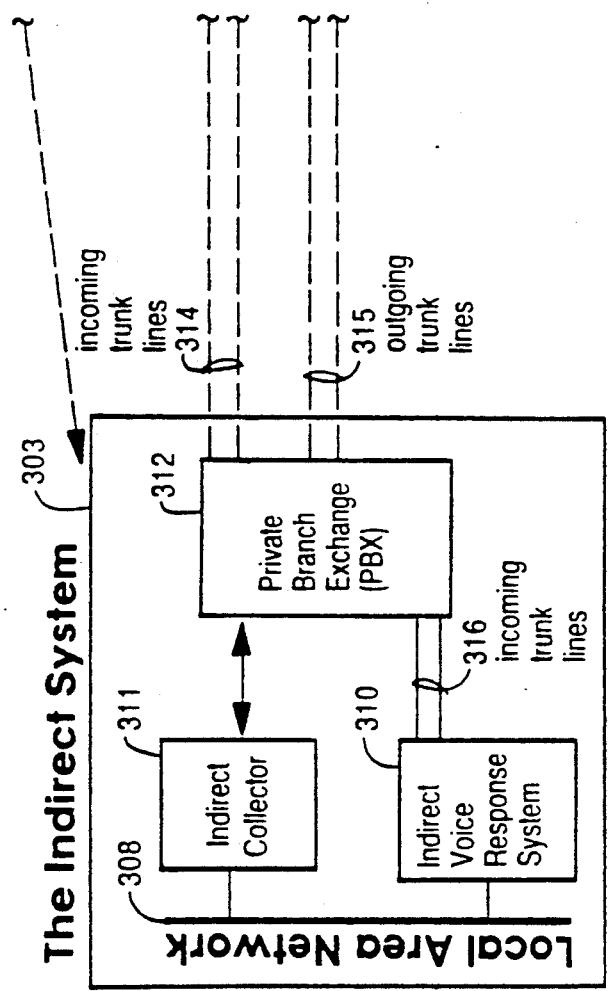

FIGS. 3a, 3b and 3c diagrammatically show communication paths between the System components of the present invention. A customer initiates a registration process by pressing keys on the mobile telephone unit 100. The call is routed through the cellular switch 300 located in the MTSO 102. The cellular switch 300 routes the call to the PSTN 301. The call is recognized by the PSTN 301 as a call to the Voice Response System 302. The Voice Response System 302 is a computer system that supervises the registration process by sending voice messages to the mobile telephone unit 100 and communicating with the Registration System 304 through a local area network 308. The Registration System 304 is a computer system responsible for storing information about all of the mobile telephone units 100 utilizing the present invention. The Registration System 304 also is responsible for communicating with a credit card clearing house 306 to obtain the credit card verification necessary for registration. The Registration System 304 communicates with credit card clearinghouse 306 through a wide area network 305 and communicates with the other System components through a local area network 308.

The Collector 307 depicted in FIG. 3b is one of a plurality of Collectors in the present invention's System network. The Collectors 307, located at MTSOs 102 in major cellular markets, monitor and rate calls made by customers. The rated call information is shipped via a wide area network 305 to the Registration System 304. The Registration System 304 adds any applicable taxes to the rated call information and then sends the information to the Administration System 309. Billing and mobile telephone unit 100 management is the function of the Administration System 309, which is described in more detail in copending U.S. patent application Ser. No. 07/527,136, entitled "Real Time Cellular Phone Rental System and Method," filed May 22, 1990 and the above PCT application, Serial No. PCT/US 91/03583, filed May 21, 1991, under the same title. The Administration System 309 receives billing and other types of data from the Registration System 304 periodically, e.g. every night. The Administration System 309 is used to print billing and credit drafts which are sent to customers' credit card providers.

The Indirect System 303 is a computer system used for call switching, call monitoring, and call rating in cellular service areas without Collector Systems 307. In cellular service areas without Collectors 307, calls are routed through the cellular switch 300 and the PSTN 301 to the Indirect System 303 through incoming trunk lines 314 from the PSTN 301. The incoming trunk lines 314 send the call to the Private Branch Exchange (PBX) 312 inside the Indirect System 303. Incoming calls are routed from the PBX 312 incoming trunk lines 314 to the Indirect Voice Response System 310 through incoming trunk lines 316 between the PBX 312 and the Indirect Voice Response System 310. The Indirect Voice Response System 310 is responsible for sending packet data units (PDUs) to the mobile telephone unit 100; these PDUs contain data necessary for mobile telephone unit 100 operation. The call is then routed from the PBX 312 through the outgoing trunk lines 315 to the PSTN 301, then the cellular switch 300, and to the customer's mobile telephone unit 100. Calls are monitored and rated by the Indirect Collector 313. The Indirect Collector 311 functions much in the same way as the Collector 307-rated call information is shipped via a wide area network 305 to the Registration System 304. The Registration System 304 adds any applicable taxes to the rated call information and then sends the information to the Administration System 309. The Administration System is described in more detail in copending U.S. patent application Ser. 07/527,136, entitled "Real Time Cellular Phone Rental System and Method," filed May 22, 1990 and the above PCT application Serial No. PCT/US 91/03583, filed May 21, 1991.

In order for a mobile telephone unit 100 to operate in the system of the present invention, it is specifically programmed for this functionality. FIG. 4 illustrates the programmed transceiver/logic unit 201 in the mobile telephone unit 100. This programming is necessary so the mobile telephone unit's 100 functions may be remotely controlled by the Voice Response System 302. telephone unit's 100 functions may be remotely controlled by the Voice Response System 302.

As shown in FIG. 4, the transceiver/logic unit 201 comprises a Central Processing Unit (CPU) 400 which controls all the functions in the mobile telephone unit 100. The Data Bus 401 is used to transmit data between the CPU 400 and the various devices it communicates with, such as the DTMF encoder 403, DTMF decoder 404, and the wide band data processor 405. (DTMFs—Dual Tone Modulating Frequencies, are defined below.) The control signals 402 are decoded signals from the CPU 400 and are used to control the various functions of the audio switch 406, handset 203, wide band data processor 405, and radio 407. The DTMF encoder 403 is used by the CPU 400 to send DTMF digits to the Registration System 304 by passing them through the audio switch 406 and then out the outgoing audio path 408 to the radio 407. The DTMF encoder 403 is also used to generate DTMF digits during normal mobile telephone unit 100 operation. The DTMF decoder 404 is used by the CPU 400 to receive DTMF digits from the Voice Response System 302 or the Indirect System 303 via the incoming audio path 408 to the radio 407 and audio switch 406. The DTMF decoder 404 is used only when the mobile telephone unit 100 is communicating with the Voice Response System 302 or the Indirect System 303.

The wide band data processor 405 sends and receives the digital control data, using standard cellular protocols. This data is used by the mobile telephone unit 100 and the cellular system to control the normal operation of the mobile telephone unit 100. The audio switch 406 is used to control which devices are currently allowed to receive and transmit data via the radio 407. The radio 407 is a standard multi-channel cellular transceiver. The audio paths 408 are the connections between the audio switch 406 and the originations and destinations of audio data.

Figure 5:
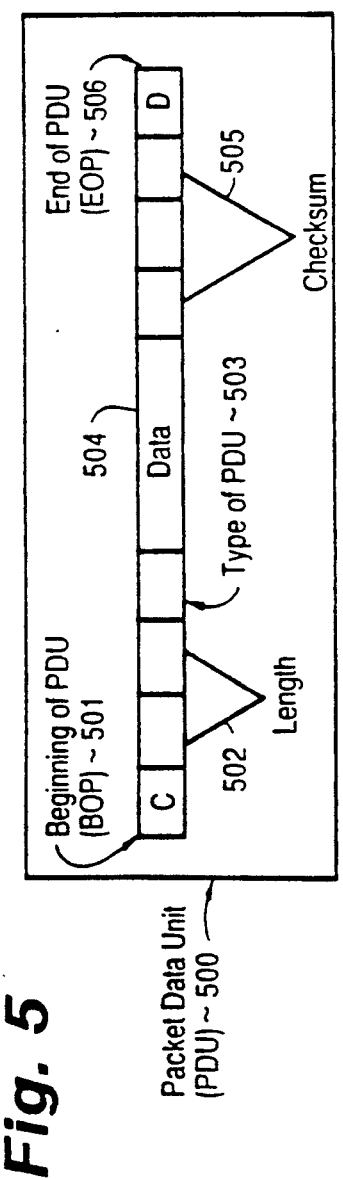
FIG. 5 is a time diagram of a Packet Data Unit, used in communications between the mobile telephone unit and the components used in practice of the present invention.

Packet Data Units (PDUs) are used in transmissions between the mobile telephone unit 100 and the Voice Response System 302 and between the mobile telephone unit 100 and the Indirect System 303. A diagram of the structure of a PDU is FIG. 5. PDUs 500 consist of sequences of Dual Tone Modulating Frequencies (DTMF) characters. DTMFs are tones in the center of the normal telephone circuit frequency band—they are the tones that are heard when dialing using a touch tone telephone. DTMFs are used in various sequences to create PDUs 500 that the System components recognize as commands. The characters in the DTMF alphabet are A, B, C, D, zero (0), one (1), two (2), three (3), four (4), five (5), six (6), seven (7), eight (8), nine (9), pound key (#), and star key (*).

PDUs 500 are identified by the DTMF character C at the start of the PDU and the DTMF character D at the end of the PDU. In the PDU structure, the DTMF character C is known as the Beginning of PDU (BOP) 501 and the DTMF character D is known as the End of the PDU (EOP) 506. When a component in the present invention receives the BOP 501 it collects all of the following DTMF characters until it receives the EOP 506. If no EOP 506 is transmitted, all DTMF characters prior to the next BOP 501 are discarded by the said System component. In PDU 500 transmissions, more than one BOP 501 at the beginning of the transmission is allowed.

Each DTMF character between the BOP 501 and the EOP 506 represent PDU 500 information. The sequence of the characters is not important and may vary. The PDU 500 contains a length field that contain DTMF characters that represent the length of the PDU 502. The length is all of the DTMF characters in the PDU excluding the BOP 501, the EOP 506, and the length character(s) 502. The PDU 500 also contains the DTMF character identifying the type of PDU 503. This may be one of 11 PDU 500 types. All necessary data DTMF characters are shipped after the type of PDU 503 and are located in the Data field 504 of the PDU 500. The DTMF character B is used to separate each character in the Data field 504. The checksum 505 is the error detection value, that is, the checksum 505 determines if the PDU transmission was successful or not. This verification occurs at the PDU 500 destination. If verification is unsuccessful, transmission is attempted two more times. The checksum algorithm is the addition of all bytes, including the length 502 up to the checksum 505. The sum is converted to a DTMF decimal value.

The list below shows each PDU 500 type and the DTMF character that identifies each PDU 500 type.

| DTMF character | Type of PDU |
| --- | --- |
| A | Synchronize |
| 0 | Connect Request |
| 1 | Connect Confirm |
| B | Phone Registration |
| 2 | Audio Control |
| 3 | Phone Conversion or Terminating Phone Conversion |
| 4 | Disconnect Request |
| 5 | Speed Dial |
| 6 | Voice Response System Registration |
| 9 | Acknowledgement |

Each DTMF character has a value. Below is a list of the values assigned to each DTMF character.

| DTMF character | Value |
| --- | --- |
| 0-9 | 0-9 |
| * | 10 |
| A | 11 |
| # | 12 |
| B | 13 |
| C | 14 |
| D | 15 |

The components and the components' method of communication in the System of the present invention having been defined, the following describes the interactions between said components occurring in the said System from the process of customer registration.

INITIAL REGISTRATION

Figure 6B:
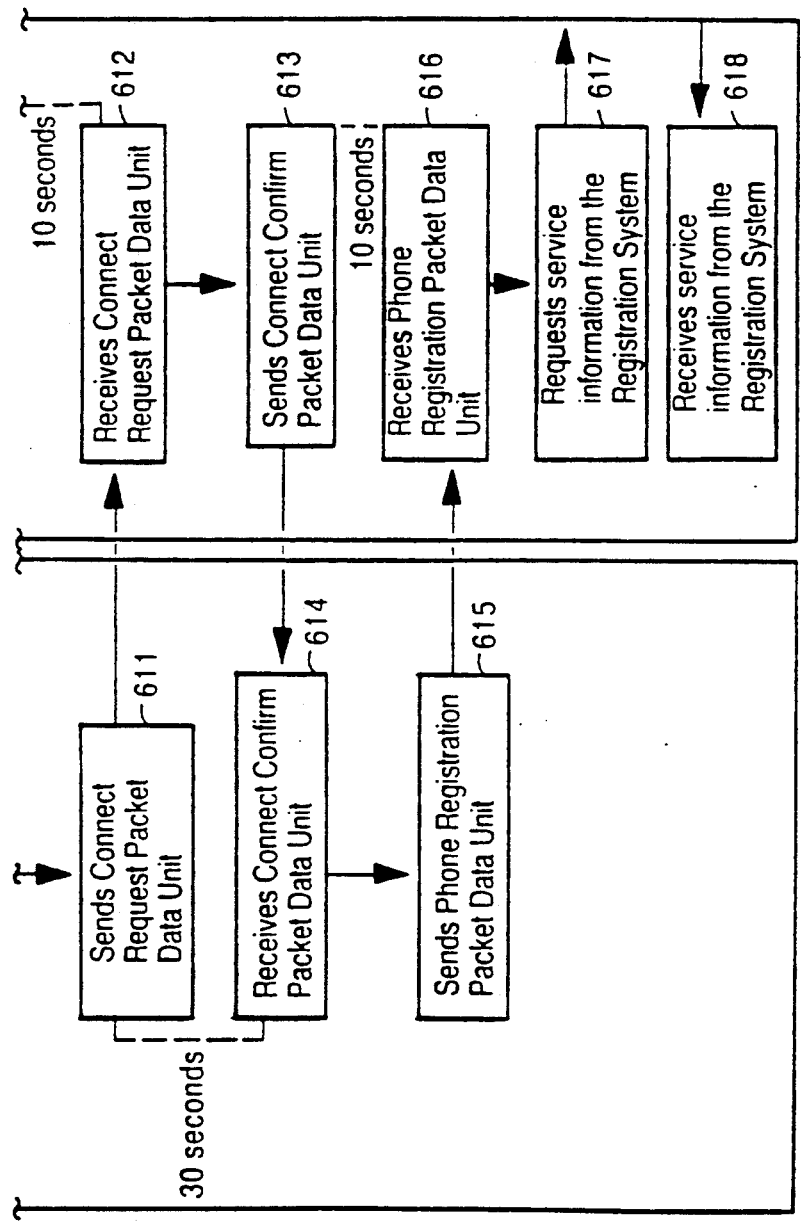

FIGS. 6a and 6b show the PDU 500 transmissions occurring during initial communication between the mobile telephone unit 100 and the Voice Response System 302. The customer rents a vehicle with an installed mobile telephone unit 100 programmed to operate within the said System. Before the customer turns on the vehicle's ignition, the mobile telephone unit 100 is in the power off state 600. When the customer turns on the vehicle ignition, the mobile telephone unit moves into the power on state 601 with the microphone, speaker, and keypad deactivated. Once the mobile telephone unit 100 is in the power on state 601, it receives a radio signal from the cell site 101 servicing the cellular system area where the vehicle is located. Every cellular service area is shared by a nonwireline carrier and a wireline carrier. The nonwireline carrier is a cellular service carrier that typically has no involvement in providing land line telephone services—this carrier operates on the portion of the radio frequency spectrum known as the A Band. The wireline carrier is a cellular service carrier that is also involved in providing land line telephone service—this carrier operates on the portion of the radio frequency spectrum known as the B Band.

The radio transmission to the mobile telephone unit 100 from the cell site 101 identifies the System Identification (SID) of the mobile telephone unit 100. The mobile telephone unit receives the SID, state 602 and moves into an idle state 603 until the customer presses the send (SND) key on the mobile telephone unit 100 keypad. The customer is given information about the said System and the registration process in the said System on instruction sheets placed in the rental vehicle. The customer is instructed to press the 1 (one) key and the send (SND) key to initiate the registration process; however, any digits pressed prior to the send (SND) key with exception to 1 (one), are ignored by the mobile telephone unit 100 which continues the initial PDU 500 transmission. The mobile telephone unit 100 is programmed to contact the Voice Response System 302 when the customer presses the send (SND) key. The mobile telephone unit 100 dials the 1-800 number for the Voice Response System 302 on the band it is currently registered on—either the A Band or the B Band, state 604. If this dial attempt fails, the mobile telephone unit 100 attempts to connect the call on the other band, state 605. If this dial attempt also fails, the mobile telephone unit 100 enters an idle state 603 until the customer presses the send (SND) key again. When the dial attempt to the Voice Response System 302 is successful, the call connects, state 607, and the Voice Response System receives the call, state 608.

The Voice Response System 302 then sends the Synchronize PDU, state 609. If the Synchronize PDU does not transmit within 30 seconds of connection, state 607, a time out occurs that causes the mobile telephone unit 100 to end communication with the Voice Response System 302. When the mobile telephone unit 100 receives the Synchronize PDU, state 610, it sends the Connect Request PDU, state 611. The Connect Request PDU identifies the encryption key and the protocol the mobile telephone unit 100 is using. Encrypting the PDUs insures the data security. The encryption key is sent in the Connect Request PDU and the key is used by the Voice Response System 302 to decode all of the PDUs it receives following the Connect Request PDU. If the Voice Response System 302 does not receive the Connect Request PDU within 10 seconds of transmission of the Synchronize PDU, state 609, the Voice Response System sends the Synchronize PDU again, up to two more times. If the transmission is still unsuccessful, communication ends.

When the Voice Response System 302 receives the Connect Request PDU, state 612, the Voice Response System 302 sends the Connect Confirm PDU, state 613. The Connect Confirm PDU and any other PDU containing data is encrypted. The mobile telephone unit 100 receives the Connect Confirm PDU, state 614 and sends the Phone Registration PDU, state 615. The Phone Registration PDU contains information about the mobile telephone unit 100 such as the Mobile Identification Number (MIN), Electronic Serial Number (ESN), and other identifying information. The Voice Response System receives the Phone Registration PDU, state 616 and requests further service information about the mobile telephone unit 100 from the Registration System 304, state 617. The Registration System 304 locates the record of the phone in its data base and sends more service information information to the Voice Response System 302, state 618. The mobile telephone unit 100 is prepared to process any PDU that may be transmitted subsequently. The PDU type transmitted following the Phone Registration PDU depends on the contents of the Phone Registration PDU.

FIG. 7 illustrates the PDU transmission occurring if the Phone Registration PDU contains information indicating this mobile telephone unit 100 must be programmed for speed dial capabilities. The Voice Response System 302 sends the Speed Dial PDU to the mobile telephone unit 100, state 700. The Voice Response System 302 only enters state 700 when the mobile telephone unit 100 needs to be programmed for new or modified speed dial numbers. The mobile telephone unit 100 receives the Speed Dial PDU, state 701, and sends an Acknowledgement PDU, state 702, to the Voice Response System 302. An Acknowledgement PDU is sent to confirm that the Speed Dial PDU was received and processed by the mobile telephone unit 100. If the Voice Response System 302 does not receive an Acknowledgement PDU within 10 seconds of Speed Dial PDU transmission, state 700, the Voice Response System 302 sends the Speed Dial PDU, state 700, up to two more times.

Figure 8A:
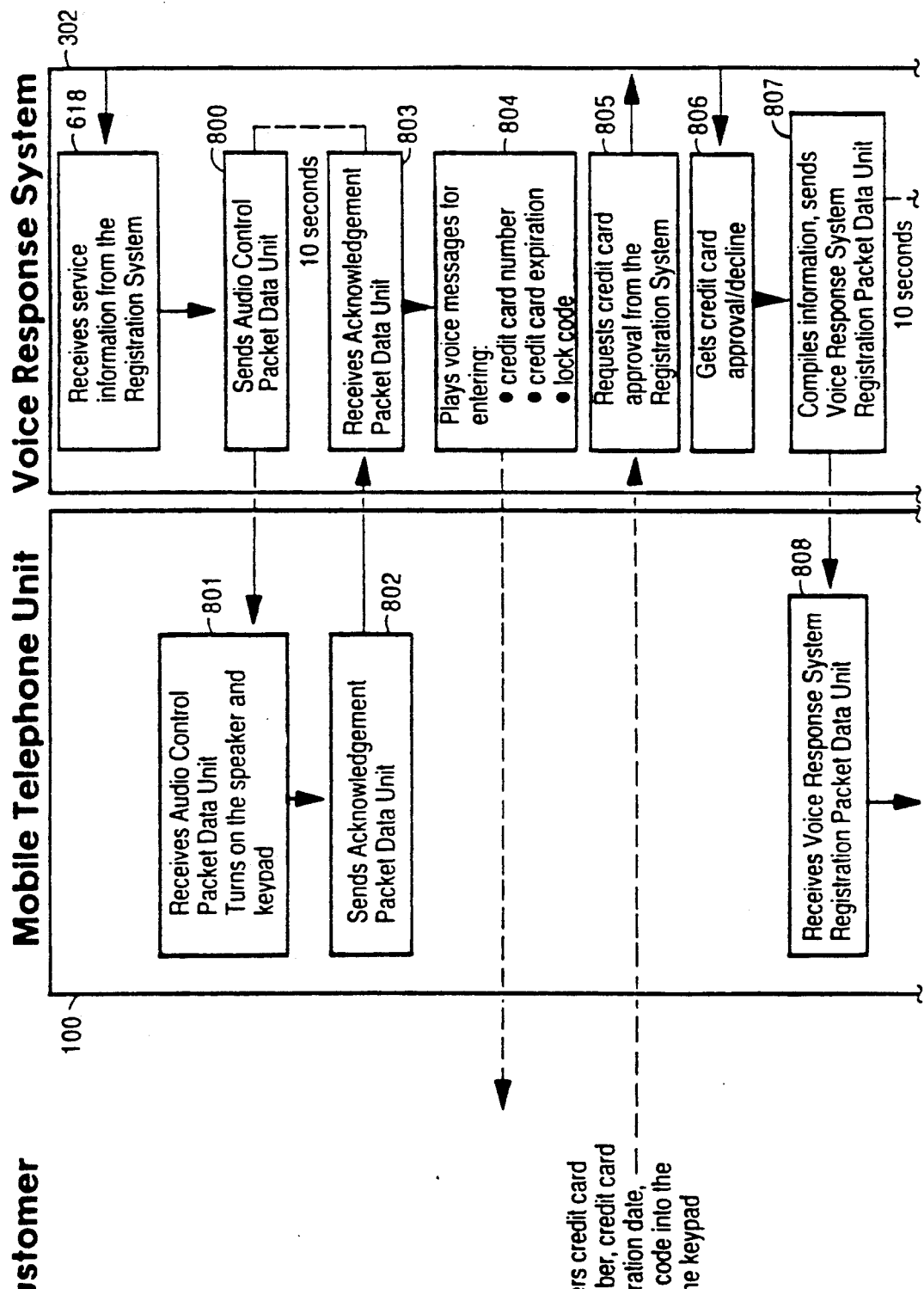
FIGS. 8a and 8b are a composite state transition diagram showing the states and state changes that occur when the customer continues through a complete registration process.
Figure 8B:
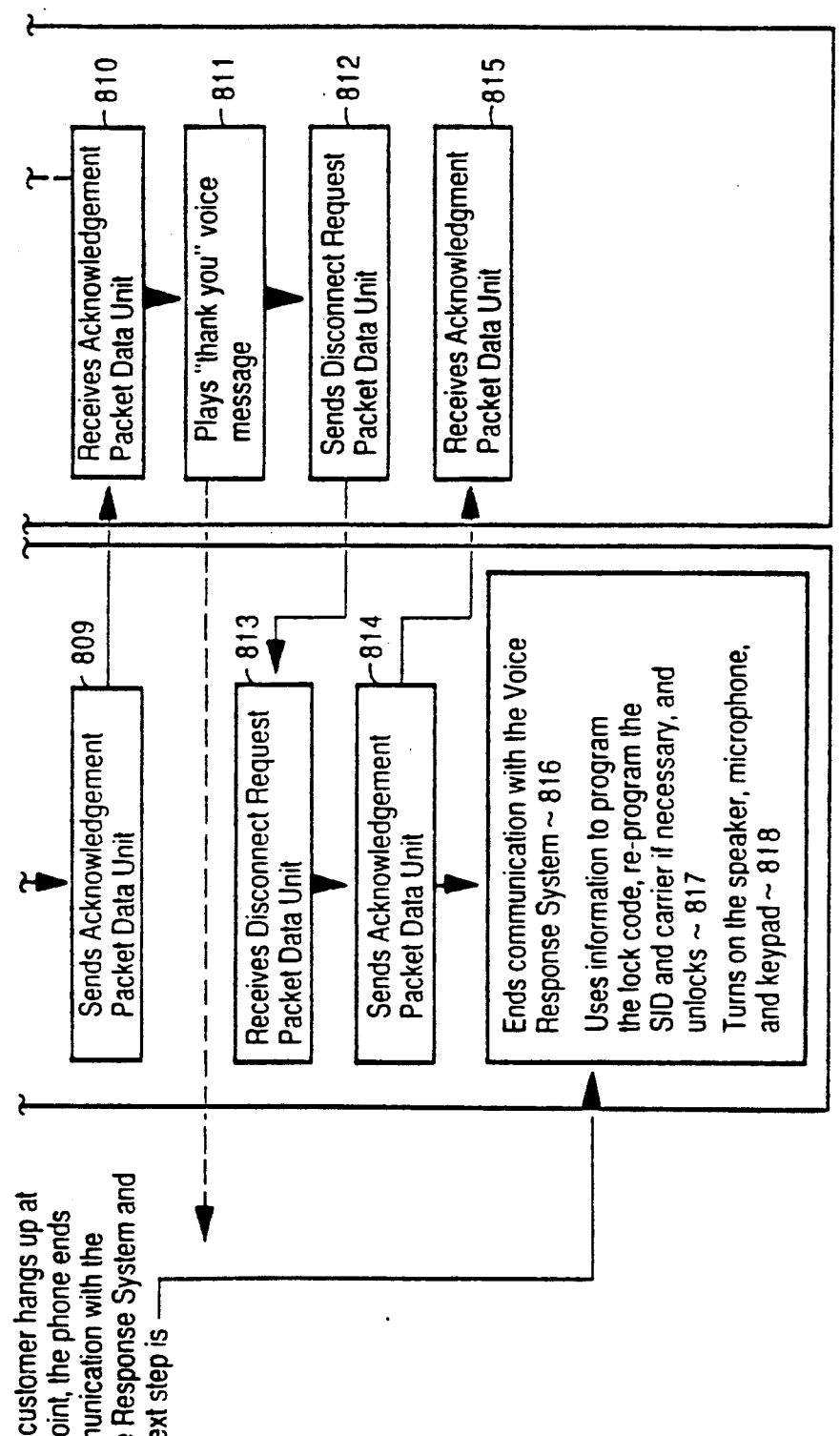

When a new customer is registering for the first time, the registration process continues from Speed Dial PDU transmission illustrated in FIG. 7 or, if Speed Dial PDU transmission is unnecessary, the registration process continues from the Voice Response System's 302 reception of the service information from the Registration System 304, state 618. FIGS. 8a and 8b depict the continuation of the registration process from state 618.

From state 618, the Voice Response System 302 sends the Audio Control PDU, state 800, to the mobile telephone unit 100. The mobile telephone unit 100 receives the Audio Control PDU and turns on the speaker and keypad, state 801. The mobile telephone unit 100 then sends an Acknowledgement PDU, state 802, to the Voice Response System 302. If the Voice Response System 302 does not receive an Acknowledgement PDU from the mobile telephone unit 100 within 10 seconds of the transmission of the Audio Control PDU, state 800, the Voice Response System 302 transmits the Audio Control PDU, state 800 again, up to two more times.

When the Voice Response System 302 receives the Acknowledgment PDU, state 803, it plays a voice message through the mobile telephone unit 100 for the customer to enter credit card number, credit card expiration date, and a lock code—this is state 804. The customer enters the credit card number and expiration date through the keypad on the handset 203 of the mobile telephone unit 100. This information is received by the Voice Response System 302, which ships the information to the Registration System 304 for credit card validation, state 805. The Registration System 304 contacts a credit card clearinghouse 306 through a wide area network 305. After receiving credit card approval or decline, the Registration System 304 sends this information to the Voice Response System 302. The Voice Response System 302 receives the credit card approval/decline, state 806 and compiles the information into a PDU called the Voice Response System Registration PDU.

The Voice Response System 302 sends the Voice Response System Registration PDU, state 807, to the mobile telephone unit 100. Information regarding credit card approval or decline is contained in the Voice Response System Registration PDU and because of this, the customer may disconnect the communication between the mobile telephone unit 100 and the Voice Response System 302 without losing valuable information. If credit was approved, disconnection at this point causes the mobile telephone unit 100 to enter state 817 which is reprogramming the lock code to be identical to the one the customer selected, reprogramming the System Identification (SID) and carrier if necessary, and unlocking. If credit was declined, disconnection causes the mobile telephone unit 100 to enter state 817 as well, the difference being that it reprograms the lock code so the customer cannot access service, it reprograms the SID and carrier if necessary, and it locks.

However, if the customer does not disconnect communication, PDU transmission continues. The mobile telephone unit 100 receives the Voice Response System PDU and sends an Acknowledgment PDU, state 809, to the Voice Response System 302. If the Voice Response System 302 does not receive an Acknowledgement PDU within 10 seconds of the transmission of the Voice Response System Registration PDU, state 807, the Voice Response System 302 transmits the Voice Response System Registration PDU, state 807 again, up to two more times. The Voice Response System 302 receives the Acknowledgement PDU, state 810. If credit is declined, the Voice Response System 302 plays a voice message through the mobile telephone unit 100, telling the customer that the credit card information was invalid and that the customer should try again later. To re-initiate the registration process the customer must again press the 1 (one) key and then the send (SND) key on the handset 203. If credit is approved, the Voice Response System 302 plays a voice message to the customer thanking him for his business, state 811. Upon completion of the thank you voice message, the Voice Response System 302 sends a Disconnect Request PDU, state 812, to the mobile telephone unit 100. The mobile telephone unit 100 receives the Disconnect Request PDU, state 813 and sends an Acknowledgement PDU, state 814. If the Voice Response System 302 does not receive an Acknowledgement PDU from the mobile telephone unit 100 within 10 seconds of transmission of the Disconnect Request PDU, state 812, the Voice Response System 302 transmits the Disconnect Request PDU, state 812 again, up to two more times.

When the Voice Response System 302 receives the Acknowledgement PDU, state 815, its communication with the mobile telephone unit 100 is complete for the registration process. Upon transmission of an Acknowledgement PDU, state 814 to the Voice Response System 302, the mobile telephone unit 100 ends communication with the Voice Response System 302 in state 816. The mobile telephone unit 100 uses information it received during the registration process to program the lock code, re-program the SID and carrier if necessary and unlock. The mobile telephone unit 100 turns on its speaker, microphone, and keypad, state 818 to allow the customer to make and receive calls.

NEW SERVICE AREA RE-REGISTRATION

When a customer enters a new cellular service area the SID and carrier for service change. This change must be registered in the System. The customer is alerted to the change in the cellular service area by a flashing roam light on the mobile telephone unit 100 handset 203. The customer must make a call before he can receive calls in the new service area. Making a call initiates a re-registration process that registers the customer with the new SID and carrier. This re-registration process is detailed in FIGS. 9a and 9b.

Figure 9A:
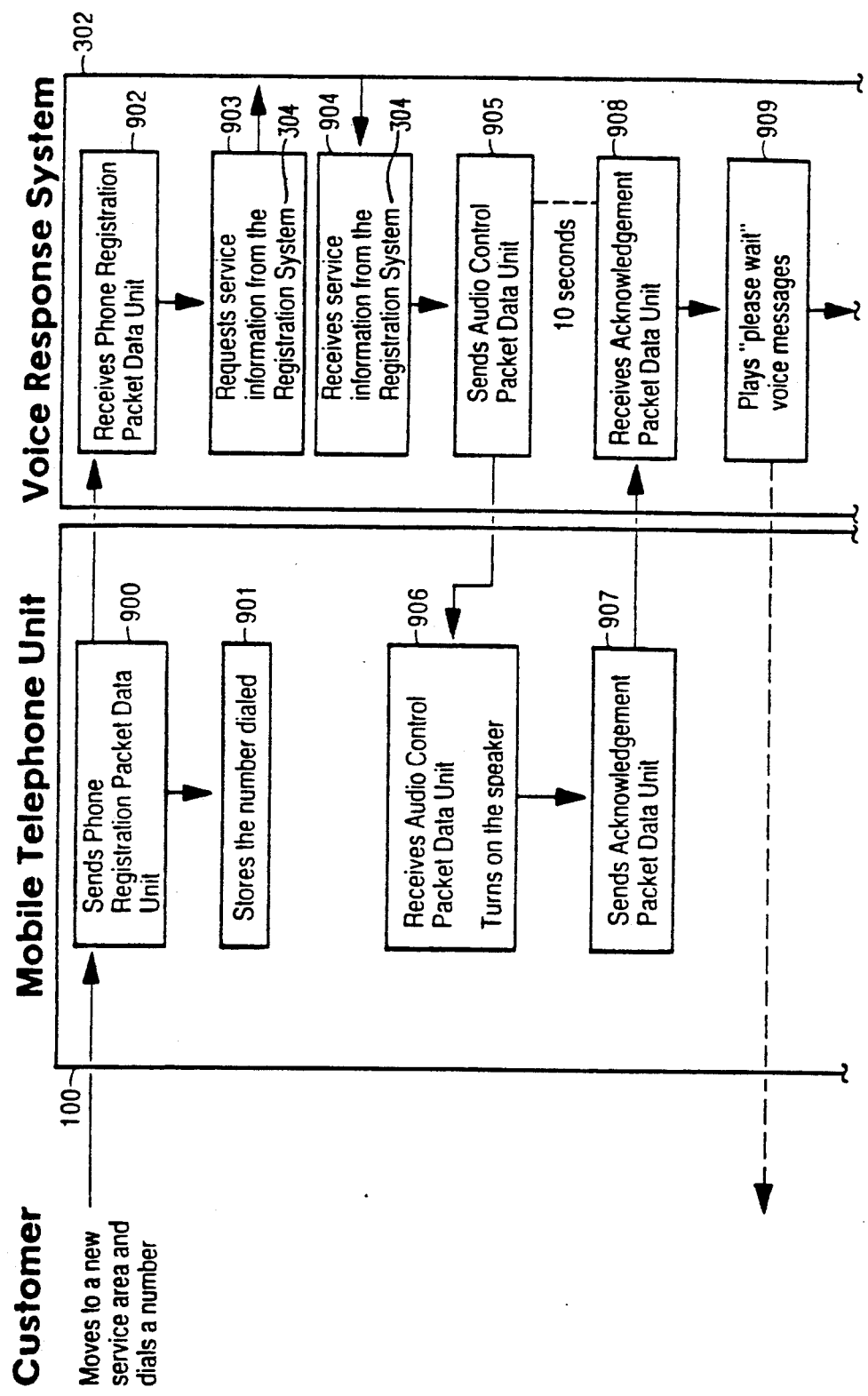
FIGS. 9a and 9b are a composite state transition diagram showing the states and state changes that occur when the customer moves into a new cellular service area and dials a number.
Figure 9B:
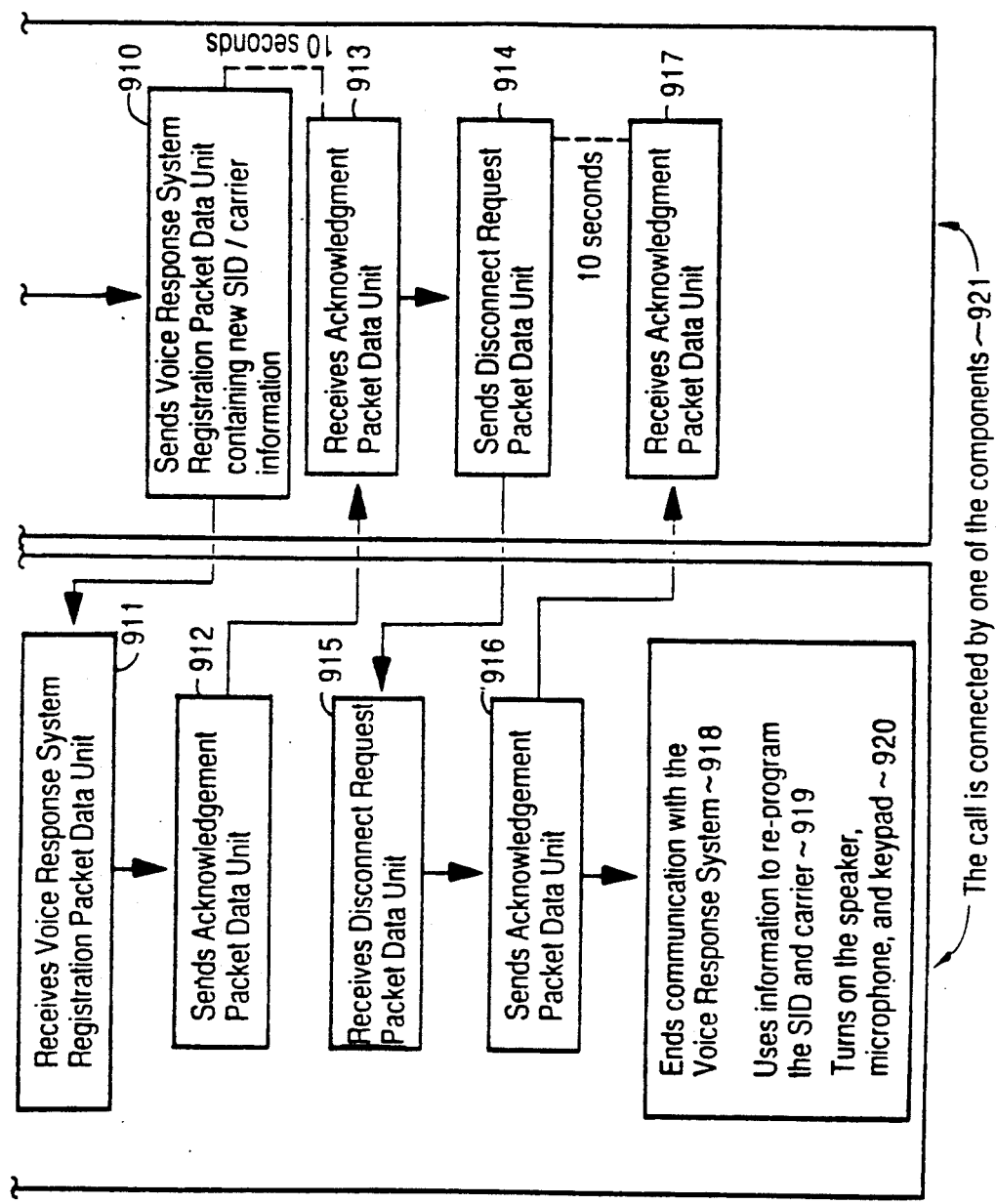

As depicted in FIGS. 9a and 9b, the customer dials a number in the new cellular service area. The mobile telephone unit 100 and the Voice Response System 302 exchange the initial PDUs such as the Synchronize PDU and the Connect Request PDU—this exchange is detailed in FIGS. 6a and 6b from state 608 through state 613. Transmission of the Phone Registration PDU, state 900 is different from the said new customer registration in that the Phone Registration PDU contains data indicating that this registration is a new service area re-registration. The mobile telephone unit stores the digits the customer dialed, state 901 as it transmits the Phone Registration PDU, state 900, so the customer's call may be connected when new service area re-registration is complete.

The Voice Response System 302 receives the Phone Registration PDU, state 902 and requests service information from the Registration System 304, state 903. The Voice Response System 302 receives this information from the Registration System 304, state 904. The Voice Response System 302 then sends an Audio Control PDU, state 905 to the mobile telephone unit 100. The mobile telephone unit 100 receives the Audio Control PDU and turns on its speaker, state 906. The mobile telephone unit 100 then sends an Acknowledgement PDU, state 907, to the Voice Response System 302. If the Voice Response System 302 does not receive an Acknowledgement PDU from the mobile telephone unit 100 within 10 seconds of transmission of the Audio Control PDU, state 905, the Voice Response System 302 transmits the Audio Control PDU, state 905 again, up to two more times.

When the Voice Response System 302 receives the Acknowledgement PDU, state 908, it plays a voice message through the mobile telephone unit 100 instructing the customer to wait while the call is being connected, state 909. At the completion of the voice message, the Voice Response System 302 sends a Voice Response System Registration PDU containing the new SID and carrier information, state 910—it received this information from the Registration System 304 while in state 904. The mobile telephone unit 100 receives the Voice Response System PDU, state 911, and sends an Acknowledgement PDU, state 912 to the Voice Response System, state 913. If the Voice Response System 302 does not receive an Acknowledgement PDU from the mobile telephone unit 100 within 10 seconds of transmission of the Voice Response System Registration PDU, state 910, the Voice Response System 302 transmits the Voice Response System Registration PDU, state 910 again, up to two more times.

When the Voice Response System 302 receives the Acknowledgement PDU, state 917, its communication with the mobile telephone unit 100 is complete. Upon transmission of an Acknowledgement PDU to the Voice Response System 302, state 916, the mobile telephone unit 100 ends communication with the Voice Response System 302, state 918. The mobile telephone unit 100 uses the information it received to re-program the SID and carrier. The mobile telephone unit 100 turns on its speaker, microphone, and keypad, state 920, to allow the customer's call to be connected.

The mobile telephone unit 100 or the Voice Response System 302 then connects the customer's call, state 921. The Voice Response System 302 determines whether the mobile telephone unit 100 or the Voice Response System 302 should connect the customer's call, state 921. If the customer has entered an area without Collector 307 service, the Voice Response System 302 connects the customer's call in order to avoid transferring the call to the Indirect System 303. If the customer is in an area without Collector 307 service, his subsequent calls are connected, monitored and rated by the Indirect System 303. If the customer has entered an area with Collector 307 service, the mobile telephone unit 100 connects the call.

AIRTIME METER EXPIRATION REGISTRATION

Each mobile telephone unit 100 is equipped with an airtime meter that calculates the amount of airtime being used. The mobile telephone unit 100 may be programmed to recognize a certain amount of airtime as being an airtime meter limit. When a customer exceeds the airtime meter limit, he must re-register in order to set the airtime meter back to zero (0).

The main difference between new service area registration and airtime meter expiration registration is that the airtime meter expiration registration requires that the customer's credit card be approved again. If the credit card the customer used to register cannot be approved again, the airtime meter expiration involves customer interaction through the mobile telephone unit 100 with the Voice Response System 302. The customer is required to submit a new credit card number for approval if he wishes to continue his cellular rental service.

Figure 10A:
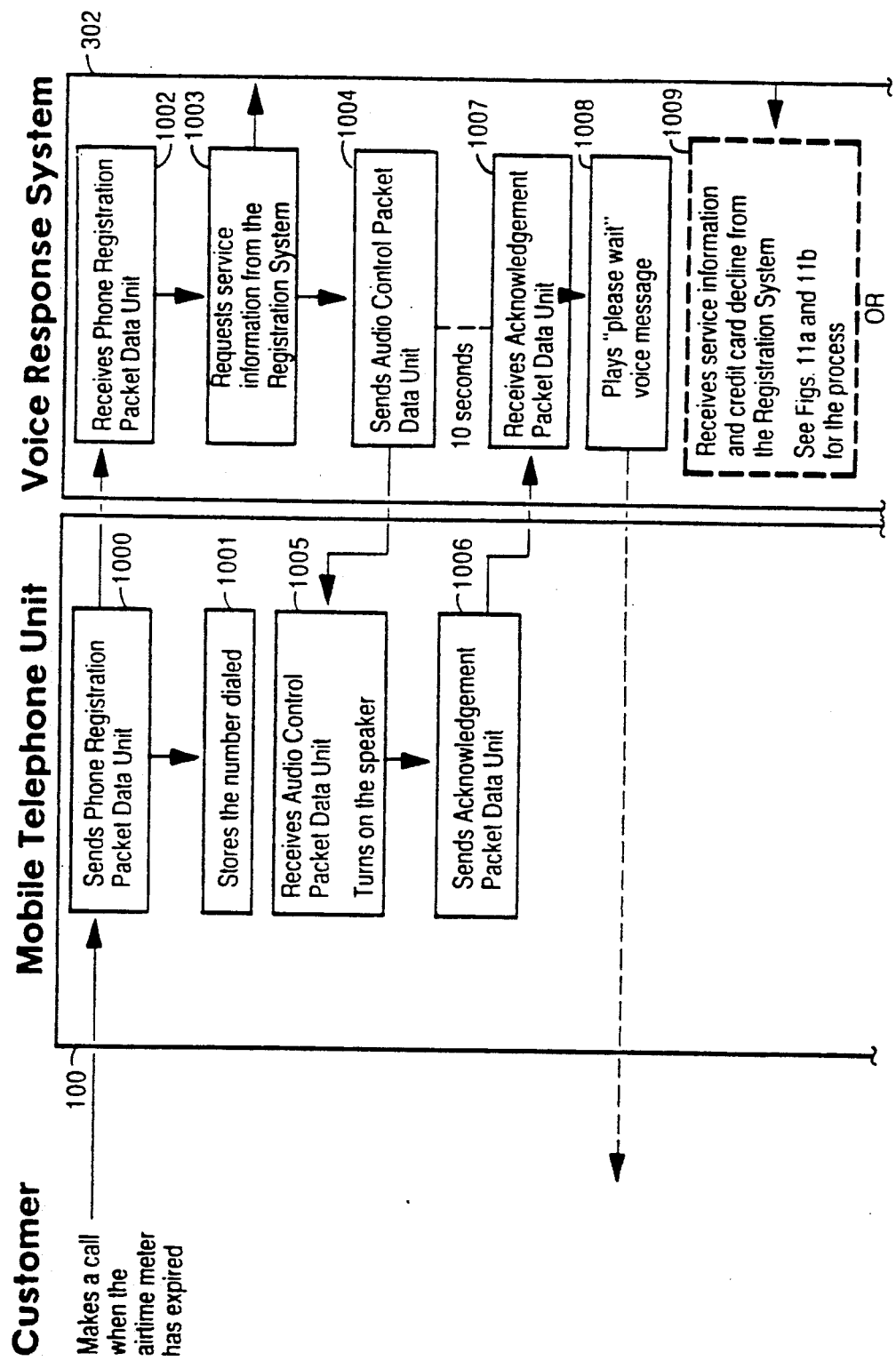
FIGS. 10 and 10b are a composite state transition diagram showing the states and state changes that occur when the airtime meter in the mobile telephone unit expires and the customer attempts a call. This diagram outlines the states and state changes that occur when the customer's credit is approved for continued mobile telephone unit use.
Figure 10B:
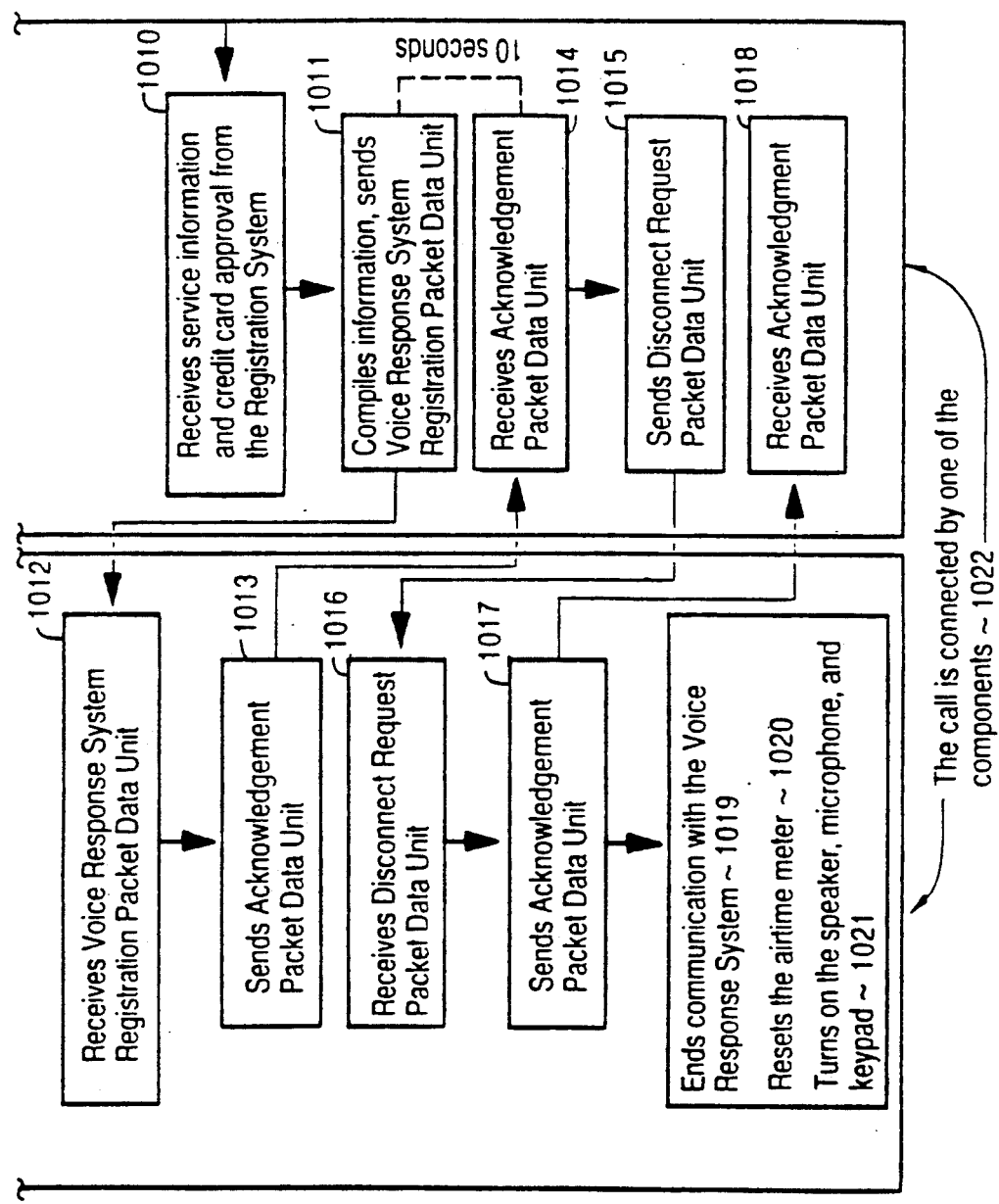

The customer is alerted to the airtime meter expiration by a flashing roam light on the mobile telephone unit 100 handset 203. The customer must complete the airtime meter expiration registration befofe he can receive calls. The airtime meter expiration registration in initiated when the customer presses the send (SND) key on the handset 203. FIGS. 10a and 10b illustrate the airtime meter expiration registration. The customer attempts to make a call, or simply presses the send (SND) key. The mobile telephone unit 100 and the Voice Response System 302 exchange the initial PDUs such as the Synchronize PDU and the Connect Request PDU—this exchange is detailed in FIGS. 6a and 6b from state 608 through 613.

The Phone Registration PDU contains data including that this registration is a airtime meter expiration registration. The mobile telephone unit stores the digits the customer dialed, if any, state 1001, as it transmits the Phone Registration PDU, state 1000, so that the customer's call may be connected when airtime meter expiration registration is complete.

The Voice Response System 302 receives the Phone Registration PDU, state 1002, and requests service information from the Registration System 304, state 1003. The request for service includes a request for credit card approval. The Registration System 304 contacts a credit card clearinghouse.

The Voice Response System 302 sends an Audio Control PDU, state 1004, to the mobile telephone unit 100. The mobile telephone unit 100 receives the Audio Control PDU and turns on its speaker, state 1005. The mobile telephone unit 100 then sends an Acknowledgement PDU to the Voice Response System 302, state 1006. If the Voice Response System 302 does not receive an Acknowledgement PDU from the mobile telephone unit 100 within 10 seconds of Audio Control PDU transmission, state 1004, the Voice Response System 302 transmits the Audio Control PDU, state 1004 again, up to two more times.

When the Voice Response System 302 receives the Acknowledgement PDU, state 1007, it plays a voice message through the mobile telephone unit 100, instructing the customer to wait.

Figure 11A:
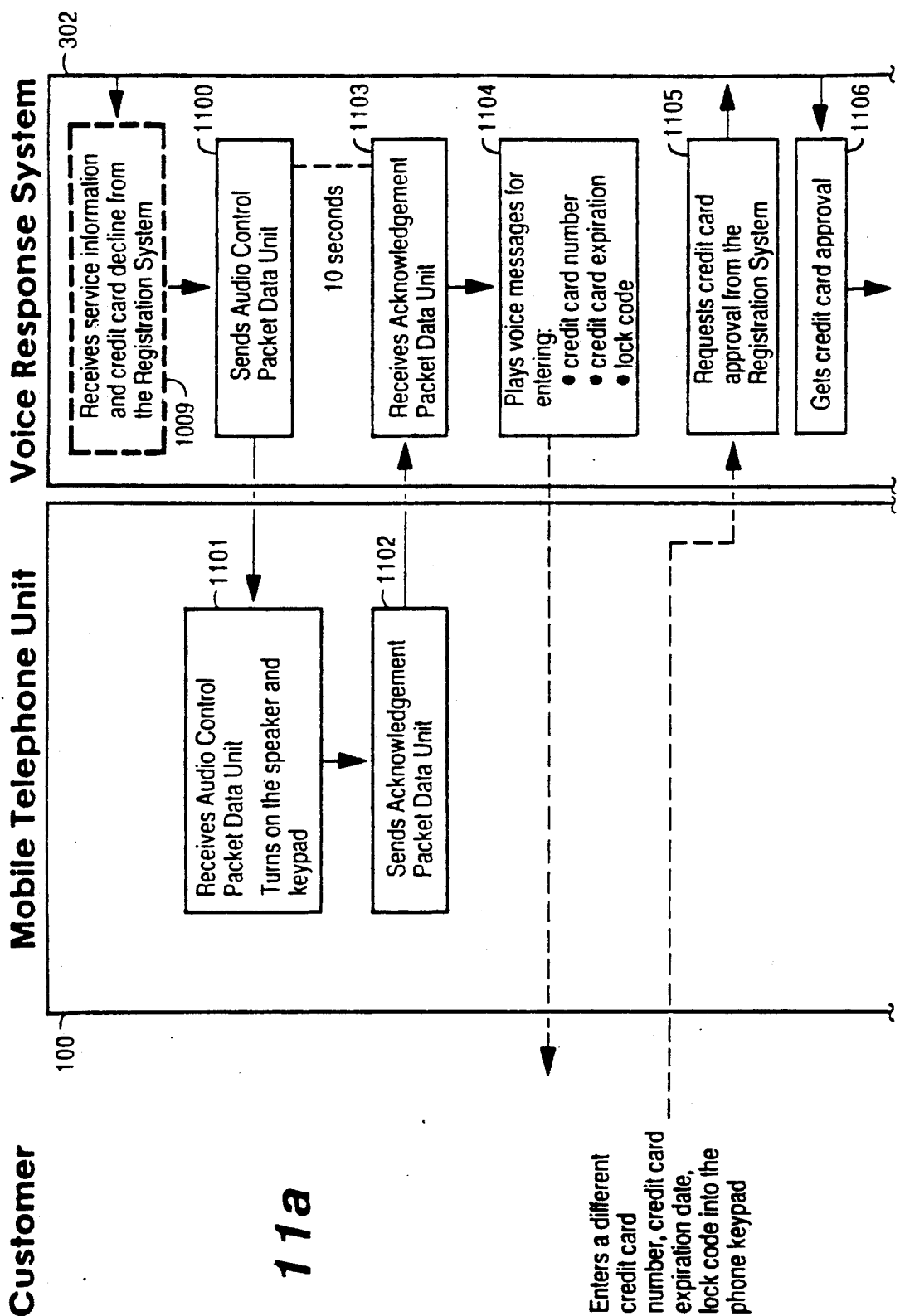
FIGS. 11a and 11b are a composite state transition diagram showing the states and state changes that occur when the customer receives credit denial after attempting to make a call.
Figure 11B:
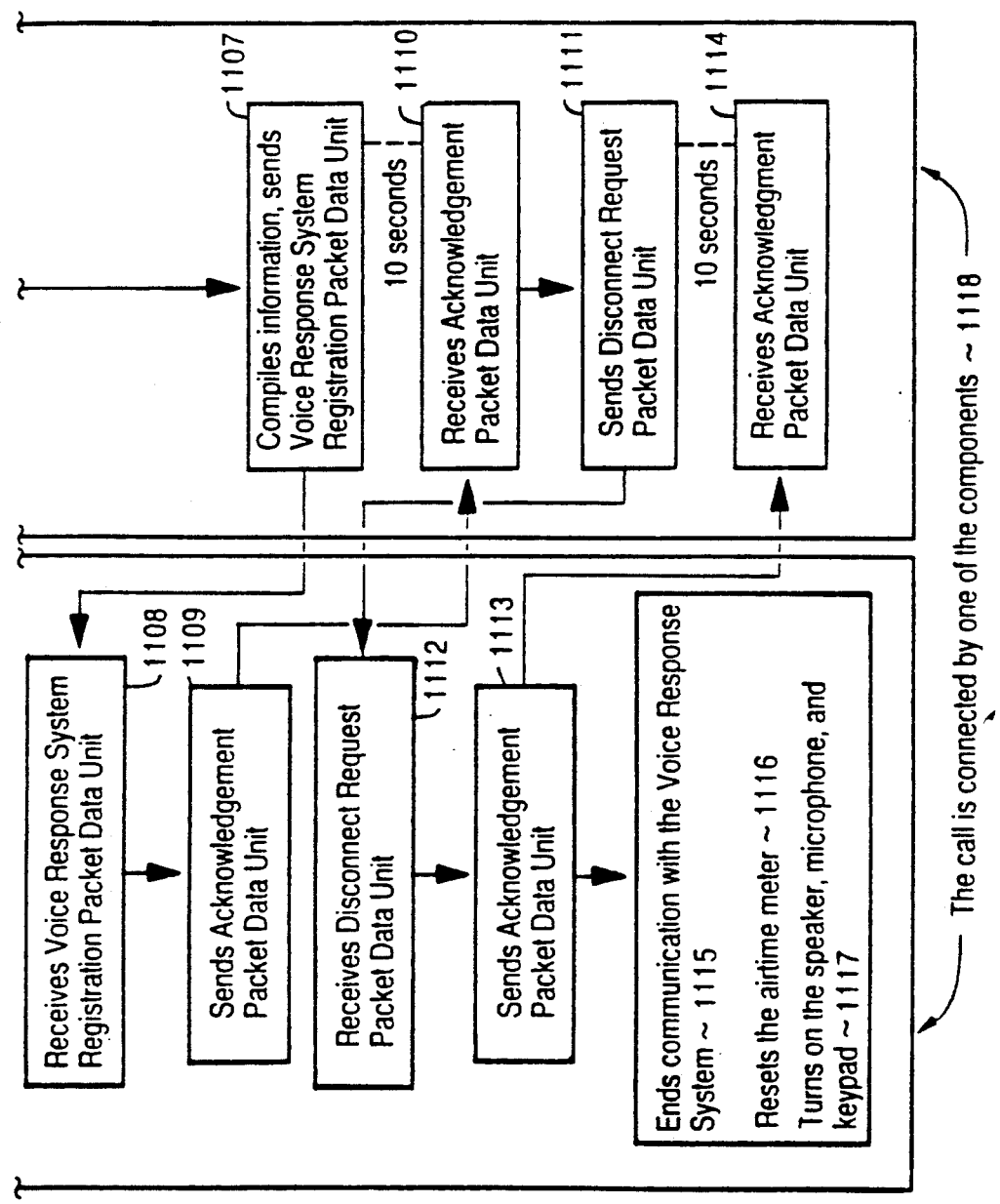

As soon as the Registration System 304 receives credit card approval/decline, state 806, from the credit card clearinghouse, it sends this information to the Voice Response System 302. The process of PDU transmissions between the Voice Response System 302 and the mobile telephone unit 100 are different if credit is declined. FIGS. 11a and 11b detail the process when credit is declined, state 1009.

When credit is approved, state 1010, the Voice Response System 302 compiles this information into the Voice Response System Registration PDU and sends this PDU to the mobile telephone unit 100, state 1011. The mobile telephone unit 100 receives the Voice Response System Registration PDU, state 1012, and sends an Acknowledgement PDU, state 1013. If the Voice Response System does not recieve an Acknowledgement PDU from the mobile telephone unit 100 within 10 seconds of Voice Response System Registration PDU transmission, state 1011, the Voice Response System 302 sends the Voice Response System PDU, state 1011 again, up to two more times.

When the Voice Response System 302 receives the Acknowledgement PDU, state 1014, it sends a Disconnect Request PDU, state 1015 to the mobile telephone unit 100. The mobile telephone unit 100 receives the Disconnect Request PDU, state 1016 and sends an Acknowledgement PDU, state 1017, to the Voice Response System 302. If the Voice Response System 302 does not receive an Acknowledgement PDU from the mobile telephone unit 100 within 10 seconds of Disconnect Request PDU transmission, state 1015, the Voice Response System 302 sends the Disconnect Request PDU, state 1015 again, up to two more times.

When the voice Response System 302 receives the Acknowledgement PDU, state 1018, its communication with the mobile telephone unit 100 is complete. Upon transmission of an Acknowledgement PDU, state 1017, to the Voice Response System 302, the mobile telephone unit 100 ends communication with the Voice Response System 302, state 1019. The mobile telephone unit 100 resets the airtime meter to zero (0), state 1020. The mobile telephone unit 100 turns on its speaker, microphone, and keypad, state 1021, so the customer's call may proceed. The mobile telephone unit 100 or the Voice Response System 302 then connects the customer's call, state 1022.

The Voice Response System 302 determines whether the mobile telephone unit 100 or the Voice Response System 302 should connect the customer's call, state 1022. If the Voice Response System 302 has the dialed digits and can make the connection quickly, the Voice Response System 302 connects the call. Otherwise, the mobile telephone unit 100 connects the call.

The process for credit decline, state 1009, during an airtime meter expiration registration involves obtaining new credit card information from the customer. As depicted in FIG. 11a, the Voice Response System 302 receives service information from the Registration System 304 and credit card decline, state 1009. The Voice Response System 302 sends an Audio Control PDU, state 1100, to the mobile telephone unit 100. The mobile telephone unit 100 receives the Audio Control PDU and turns on the speaker and keypad, state 1101. The mobile telephone unit 100 sends an Acknowledgement PDU, state 1102, to confirm that the Audio Control PDU was received. If the Voice Response System 302 does not receive an Acknowledgement PDU from the mobile telephone unit 100 within 10 seconds of Audio control PDU transmission, state 1100, the Voice Response System 302 sends the Audio Control PDU, state 1100 again, up to two more times.

When the Voice Response System 302 receives the Acknowledgement PDU, state 1103, it plays a voice message through the mobile telephone unit 100 prompting the customer to enter a new credit card number, credit card expiration date, and a lock code, state 1104. When the Voice Response System 302 receives credit card information from the customer through the mobile telephone unit 100, the Voice Response System 302 requests credit card validation from the Registration System 304, state 1105.

The Registration System 304 contacts a credit card clearinghouse to obtain credit card approval or decline. If credit is declined, this registration fails and the mobile telephone unit locks. The customer must press the 1 (one) key and the send (SND) key on the keypad of the mobile telephone unit 100 in order to initiate a new registration process.

If credit is approved, state 1106, the Voice Response System 302 compiles this information into the Voice Response System Registration PDU and sends it, state 1107, to the mobile telephone unit 100. The mobile telephone unit 100 receives the Voice Response System Registration PDU, state 1108, and sends an Acknowledgement PDU, state 1109, to the Voice Response System 302. If the Voice Response System 302 does not receive an Acknowledgement PDU from the mobile telephone unit 100 within 10 seconds of Voice Response System Registration PDU transmission, state 1107, the Voice Response System 302 sends the Voice Response System Registration PDU, state 1107 again, up to two more times.

When the Voice Response System 302 receives the Acknowledgement PDU, state 1110, it sends a Disconnect Request PDU, state 1111, to the mobile telephone unit 100. The mobile telephone unit 100 receives the Disconnect Request PDU, state 1112, and sends an Acknowledgment PDU, state 1113, to the Voice Response System 302. If the Voice Response System 302 does not receive an Acknowledgement PDU from the mobile telephone unit 100 within 10 seconds of Disconnect Request PDU transmission, state 1111, the Voice Response System 302 sends the Disconnect Request PDU, state 1112, again, up to two more times.

When the Voice Response System 302 receives the Acknowledgement PDU, state 1114, its communication with the mobile telephone unit 100 is complete. Upon transmission of an Acknowledgement PDU, state 1113, to the Voice Response System 302, the mobile telephone unit 100 ends communication with the Voice Response System 302, state 1115. The mobile telephone unit 100 resets the airtime meter to zero (0), state 1116. The mobile telephone unit 100 turns on its speaker, microphone, and keypad, state 1117, so the customer's call may proceed. The mobile telephone unit 100 or the Voice Response System 302 then connects the customer's call, state 1118.

The Voice Response System 302 determines whether the mobile telephone unit 100 or the Voice Response System 302 should connect the customer's call, state 1118. If the Voice Response System 302 has the dialed digits and can make the connection quickly, the Voice Response System 302 connects the call. Otherwise, the mobile telephone unit 100 connects the call.

MAKING CALLS IN AREAS WITHOUT COLLECTOR SYSTEM SERVICE

Calls made in an area without a Collector 307 may be serviced by the Indirect System 303. When a customer registers in an area without Collector 307 service, the normal registration process occurs. The only difference is that the calls made after registration is complete are rated by the Indirect System 303 instead of a Collector 307.

Figure 12A:
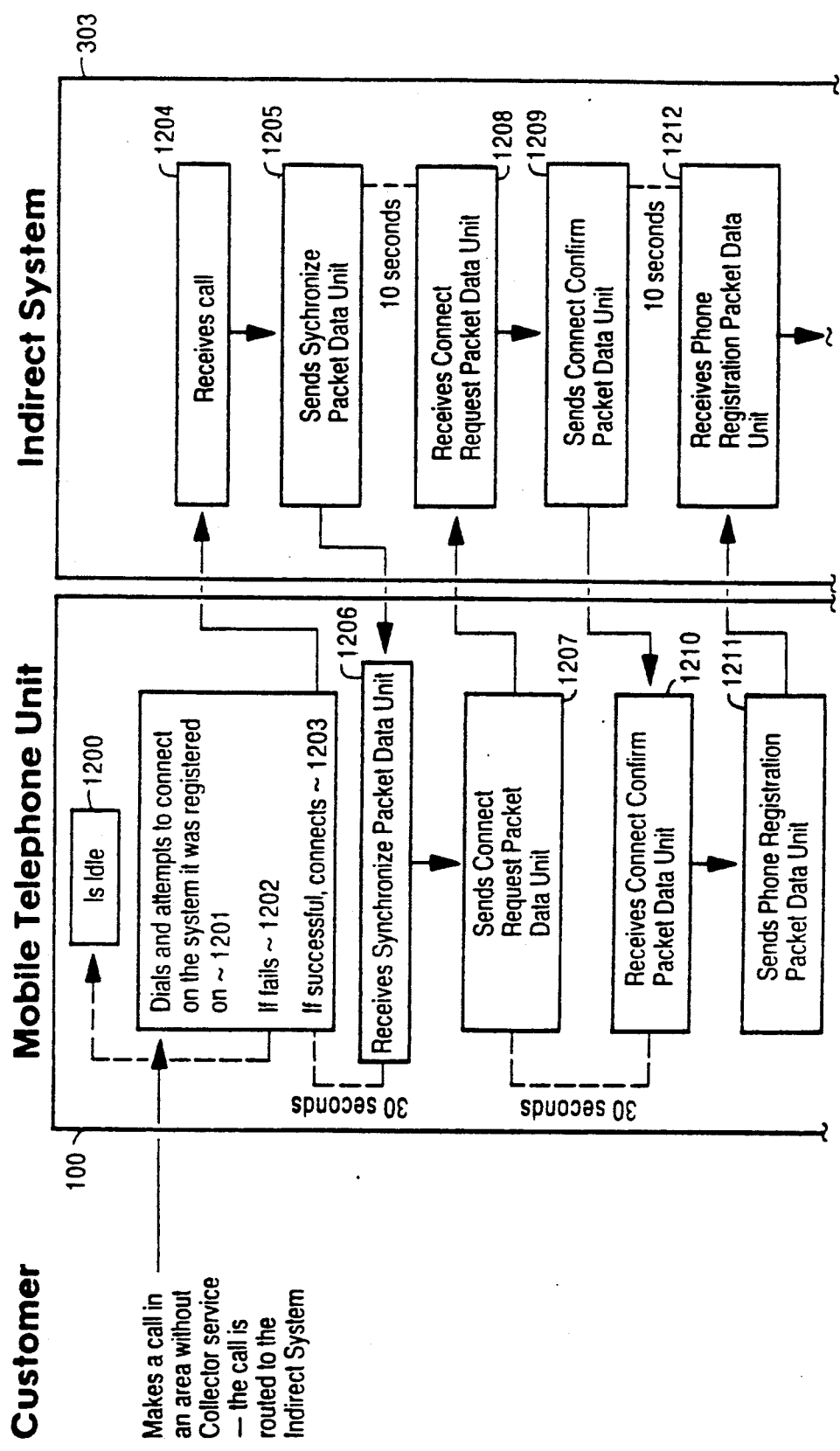
FIGS. 12a and 12b are a composite state transition diagram showing the states and state changes that occur when the customer attempts to make a call in a cellular service area without Collector System service.
Figure 12B:
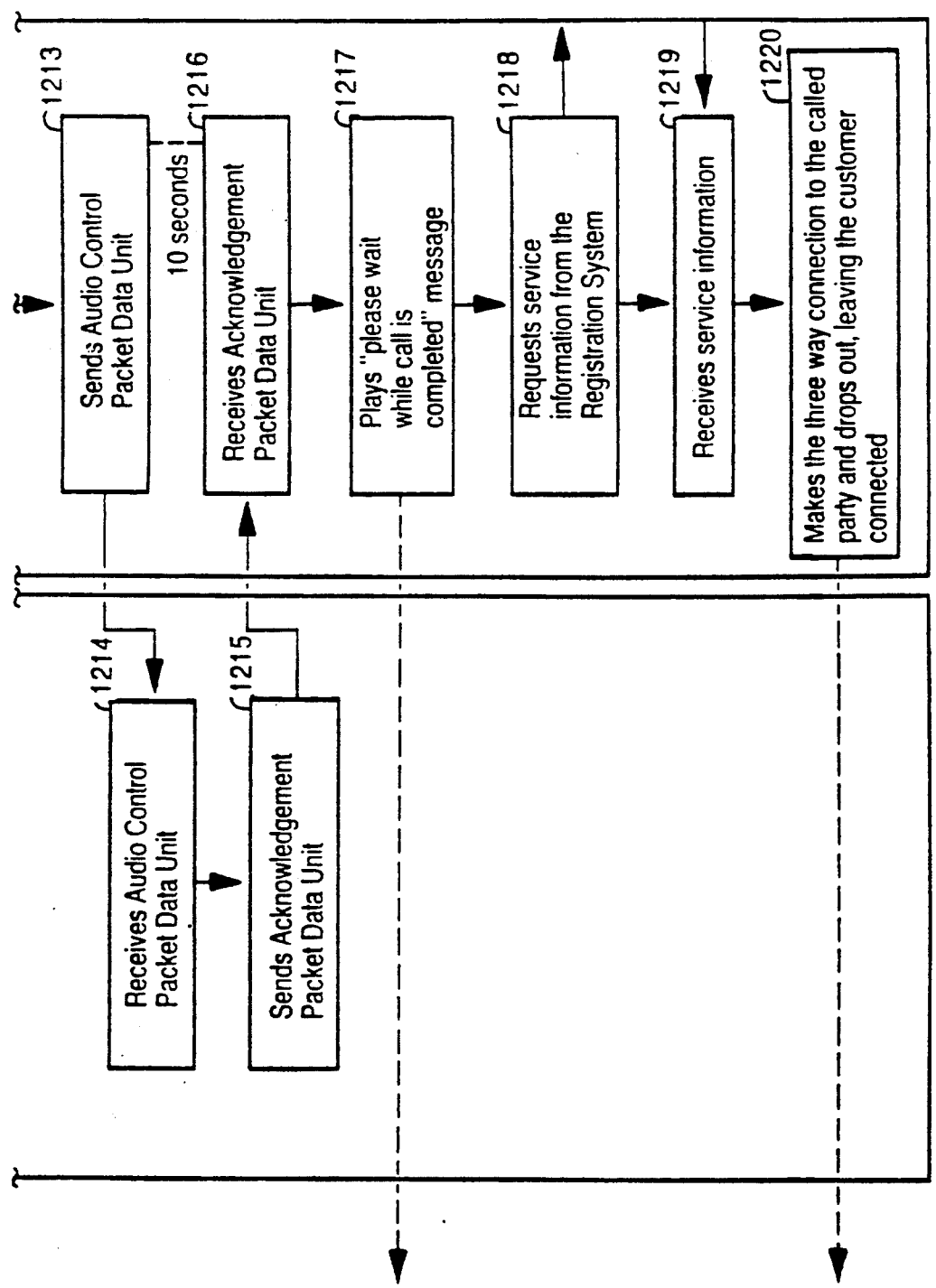

When a registered customer makes a call in an area without a Collector 307, a process of PDU transmission occurs that allows the call to be connected and rated by the Indirect System 303. FIGS. 12a and 12b illustrate this process. Initially, the mobile telephone unit 100 is idle, state 1200. When the customer makes a call, the mobile telephone unit 100 dials and attempts to connect on the System on which it was registered, state 1201. If this dial attempt fails, state 1202, the mobile telephone unit 100 reverts to the idle state 1200. The customer must dial again. If the dial attempt is successful, it connects to the Indirect System 303, state 1203.

The Indirect System 303 receives the call, state 1204, and sends the Synchronize PDU, state 1205, to the mobile telephone unit 100. If the Synchronize PDU does not transmit successfully within 30 seconds of connection, state 1203, a time out occurs that causes the mobile telephone unit 100 to end communication with the Indirect System 303.

The mobile telephone unit 100 receives the Synchronize PDU, state 1206, and sends the Connect Request PDU, state 1207, to the Indirect System 303. The Indirect System 303 receives the Connect Request PDU, state 1208, and sends the Connect Confirm PDU, state 1209, to the mobile telephone unit 100. If the mobile telephone unit 100 does not receive the Connect Confirm PDU within 30 seconds of the transmission of the Connect Request PDU, state 1207, the mobile telephone unit 100 sends the Connect Request PDU, state 1207, again, up to two more times.

When the mobile telephone unit 100 receives the Connect Confirm PDU, state 1210, it sends the Phone Registration PDU, state 1211, to the Indirect System 303. If the Indirect System 303 does not receive the Phone Registration PDU within 10 seconds of the transmission of the Connect Confirm PDU, state 1209, the Indirect System 303 sends the Connect Confirm PDU, state 1209 again, up to two more times.

When the Indirect System 303 receives the Phone Registration PDU, state 1212, it sends an Audio Control PDU, state 1213, to the mobile telephone unit 100. The mobile telephone unit 100 receives the Audio Control PDU, state 1214, and sends an Acknowledgement PDU, state 1215, to the Indirect System 303. If the Indirect System 303 does not receive an Acknowledgement PDU within 10 seconds of Audio Control PDU transmission, state 1213, the Indirect System 303 sends the Audio Control PDU, state 1213 again, up to two more times.

As soon as the Indirect System 303 receives the Acknowledgement PDU, state 1216, it plays a voice message through the mobile telephone unit 100 telling the customer to wait while the call is completed. The Indirect System 303 also requests service information from the Registration System 304, state 1218. The Registration System 304 provides service information and sends it to the Indirect System 303. The Indirect System 303 receives the service information, state 1219. It then makes the three way connection to the called party and drops out, leaving the customer connected, state 1220. Any calls made by the customer while in this service area are monitored and rated by the Indirect System 303.

AREAS WITHOUT COLLECTOR SYSTEM OR INDIRECT SYSTEM SERVICE

Some areas are without Collector 307 or Indirect System 303 service. When a new customer attempts to register or a registered customer attempts to make a call in one of these areas, a PDU transmission occurs that allows the Voice Response System 302 to send a voice message to the mobile telephone unit 100, alerting the customer to the fact that no service is available.

Figure 13A:
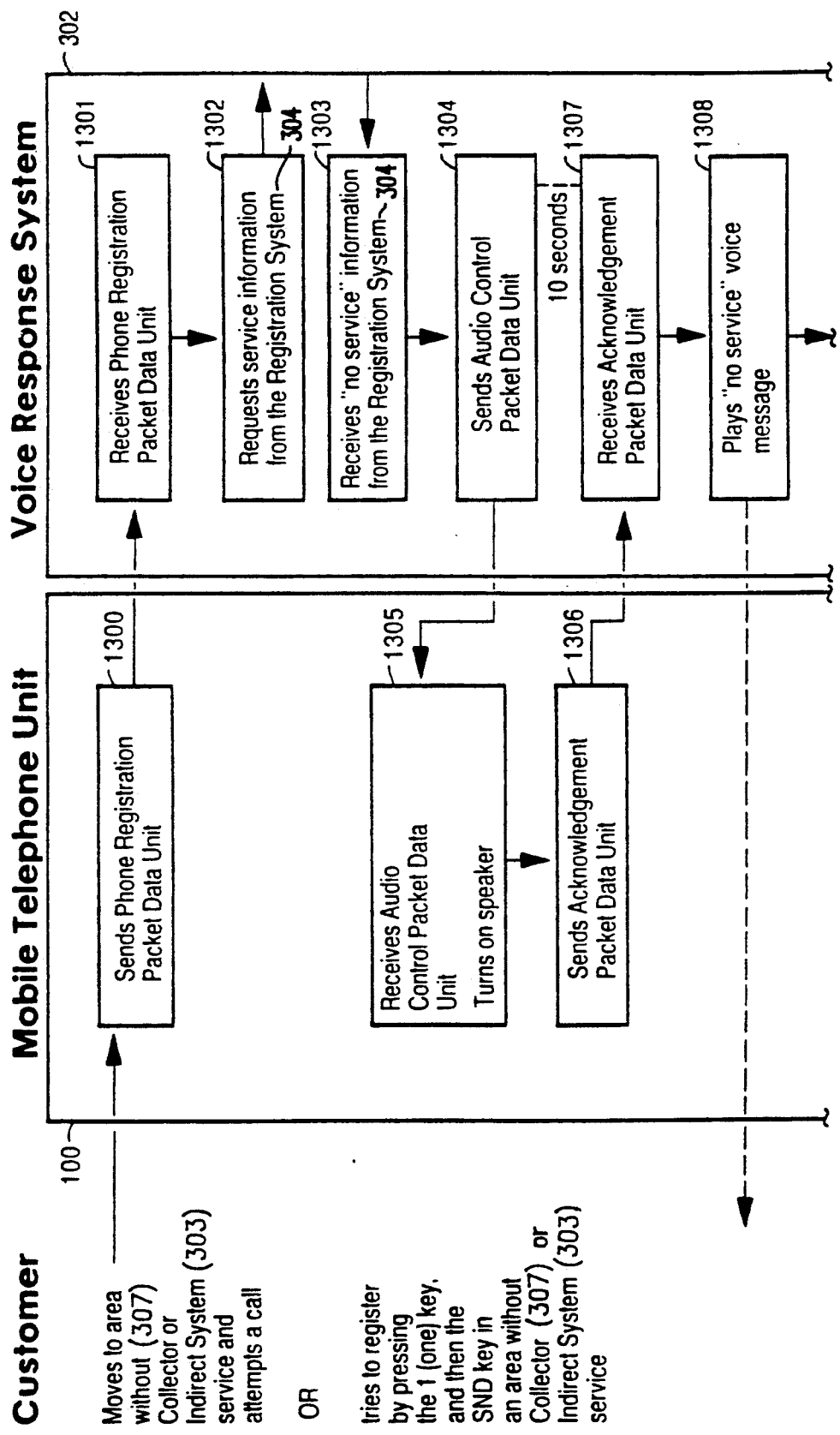
FIGS. 13a and 13b are a composite state transition diagram showing the states and state changes that occur when the customer attempts to make a call in a cellular service area not equipped for practice of the present invention.
Figure 13B:
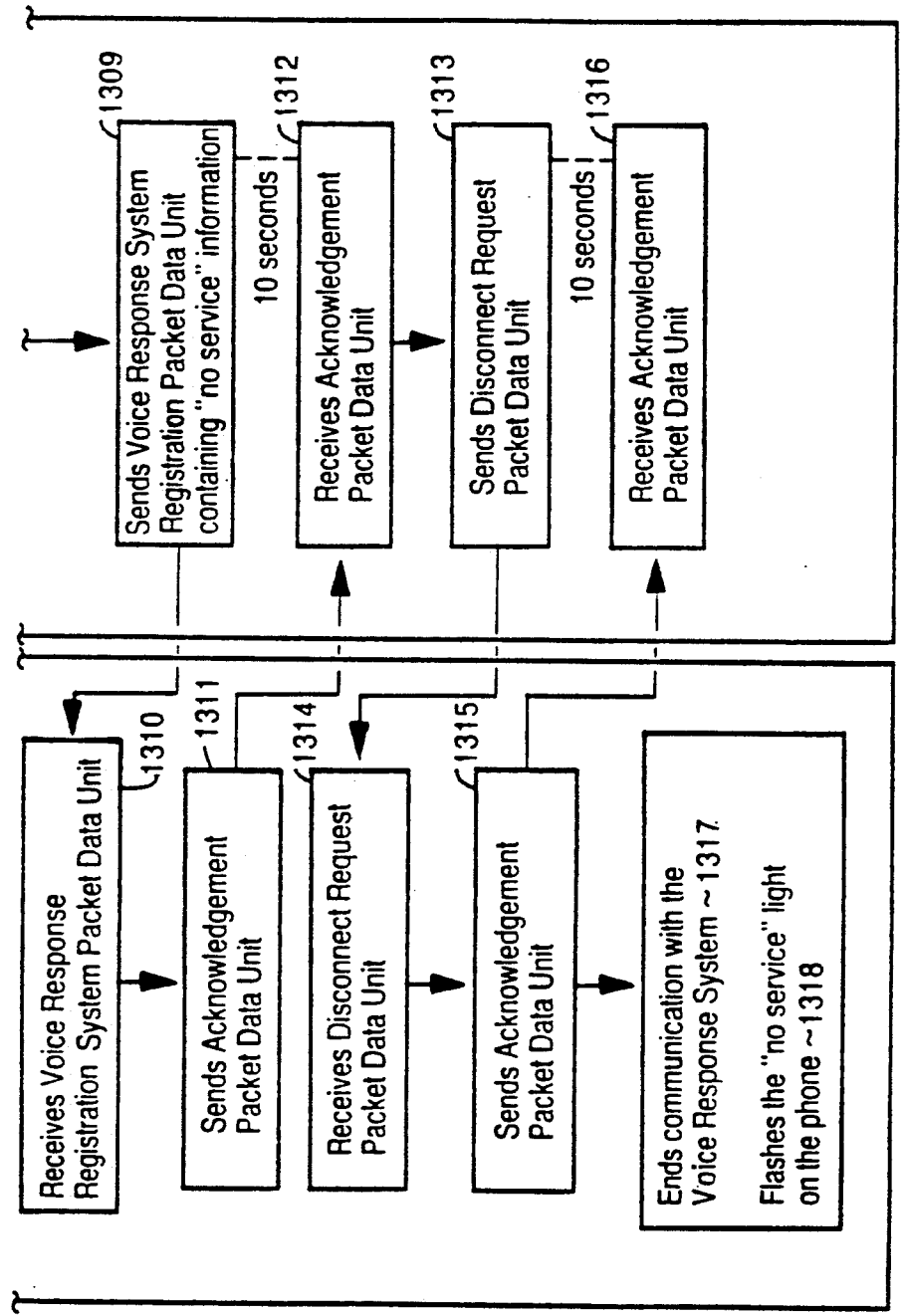

FIGS. 13a and 13b illustrate this PDU transmission. The customer moves into an area without Collector 307 or Indirect System 303 service. The mobile telephone unit 100 and the Voice Response System 302 exchange the initial PDUs such as the Synchronize PDU and the Connect Request PDU—this exchange is detailed in FIGS. 6a and 6b in states 608 through 613. The mobile telephone unit 100 then sends the Phone Registration PDU to the Voice Response System, state 1300. The Voice Response System 302 receives the Phone Registration PDU, state 1301 and requests service information from the Registration System 304, state 1302.

The Registration System 304 sends the information to the Voice Response System 302. The Voice Response System 302 receives the service information, state 1303, which contains data indicating that the customer is in an area without Collector 307 or Indirect System 303 service. The Voice Response System 302 sends an Audio Control PDU, state 1304, to the mobile telephone unit 100.

The mobile telephone unit 100 receives the Audio Control PDU and turns on the speaker, state 1305. The mobile telephone unit 100 sends an Acknowledgment PDU, state 1306 to the Voice Response System 302. If the Voice Response System 302 does not receive an Acknowledgement PDU within 10 seconds of transmission of the Audio Control PDU, state 1304, the Voice Response System 302 sends the Audio Control PDU, state 1304, again, up to two more times.

When the Voice Response System 302 receives the Acknowledgement PDU, state 1307, from the mobile telephone unit 100, the Voice Response System 302 plays a voice message through the mobile telephone unit 100 indicating to the customer that no service is available, state 1308. Upon completion of the voice message, the Voice Response System 302 sends a Voice Response System Registration PDU, state 1309, to the mobile telephone unit 100. This Voice Response System Registration PDU contains data indicating there is no Collector 307 or Indirect System 303 service in the customer's calling area. The mobile telephone unit 100 receives the Voice Response System Registration PDU, state 1310, and sends an Acknowledgement PDU, state 1311, to the Voice Response System 302. If the Voice Response System does not receive an Acknowledgement PDU within 10 seconds of transmission of the Voice Response System Registration PDU, state 1309, the Voice Response System 302 sends the Voice Response System Registration PDU, state 1309 again, up to two more times.

Upon receipt of the Acknowledgement PDU, state 1312 from the mobile telephone unit 100, the Voice Response System 302 sends a Disconnect Request PDU, state 1313, to the mobile telephone unit 100. The mobile telephone unit 100 receives the Disconnect Request PDU, state 1314, and sends an Acknowledgement PDU, state 1315, to the Voice Response System 302. If the Voice Response System 302 does not receive an Acknowledgement PDU within 10 seconds of transmission of the Disconnect Request PDU, state 1313, the Voice Response System 302 sends the Disconnect Request PDU, state 1313 again, up to two more times.

When the Voice Response System 302 receives the Acknowledgement PDU, state 1316, its communication with the mobile telephone unit 100 is complete. Upon transmission of an Acknowledgement PDU, state 1315, to the Voice Response System 302, the mobile telephone unit 100 ends communication with the Voice Response System 302, state 1317. The mobile telephone unit 100 begins to flash the no service light on the mobile telephone unit 100 handset 203, state 1318.

INCOMING CALLS

A customer must complete the initial registration process in order to receive calls. If the mobile telephone unit 100 has not been registered, it will not ring.

When a customer enters a new service area, or the airtime meter in the mobile telephone unit 100 has expired, the customer must complete a call before receiving calls. Completing a call initiates the re-registration process. Customers are alerted to a new SID or airtime meter expiration by a flashing roam light on the mobile telephone unit 100 handset 203.

When a customer's calls are connected and rated without involving the Indirect System 303, calls are sent directly to the mobile telephone unit 100. The mobile telephone unit 100 rings, the customer picks up the handset 203 or presses the send (SND) key, and the call may proceed. No PDU transmission is necessary.

Figure 14A:
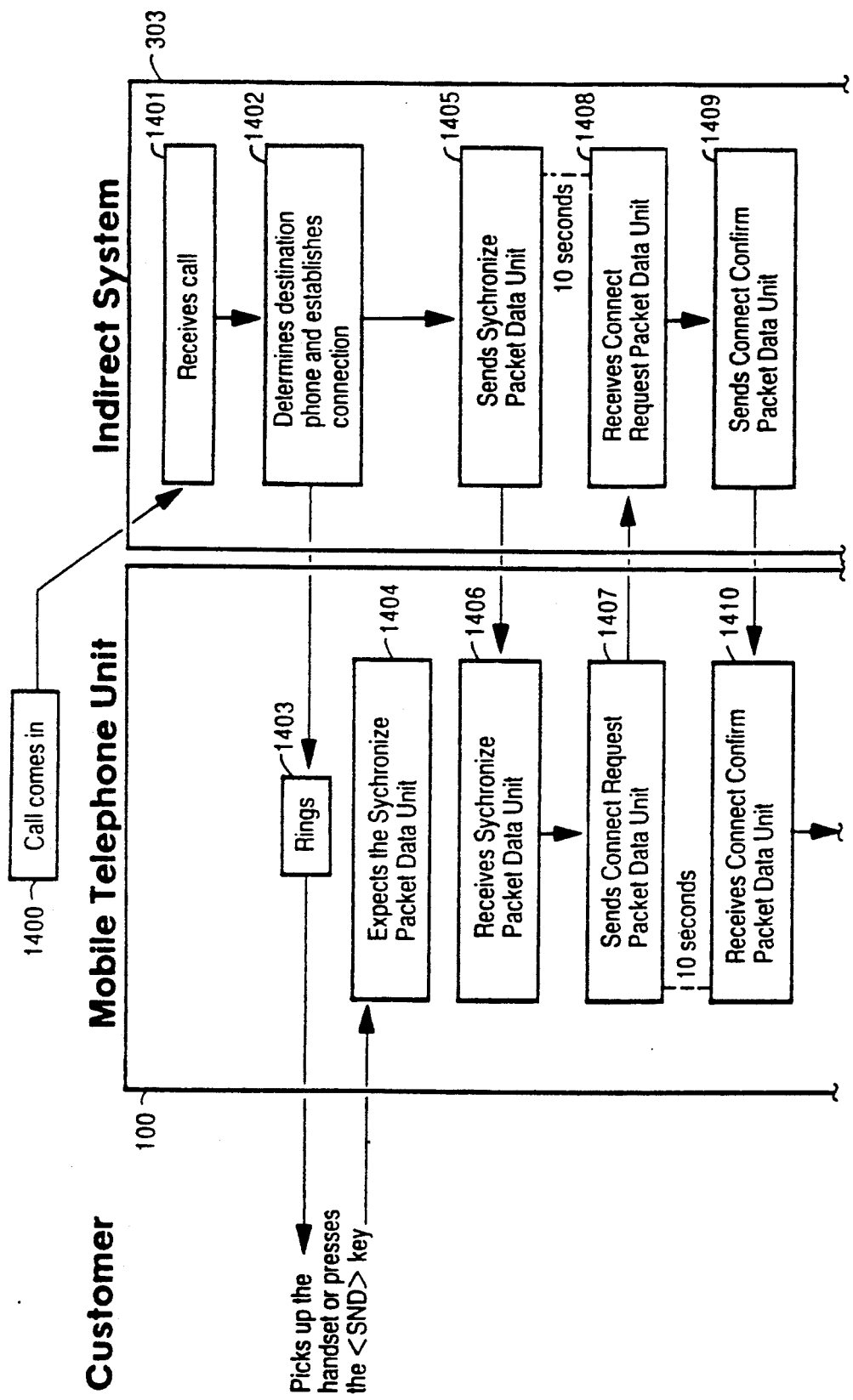
FIGS. 14a and 14b are a composite state transition diagram showing the states and state changes that occur when the customer receives an incoming call in a cellular service area without Collector System service.
Figure 14B:
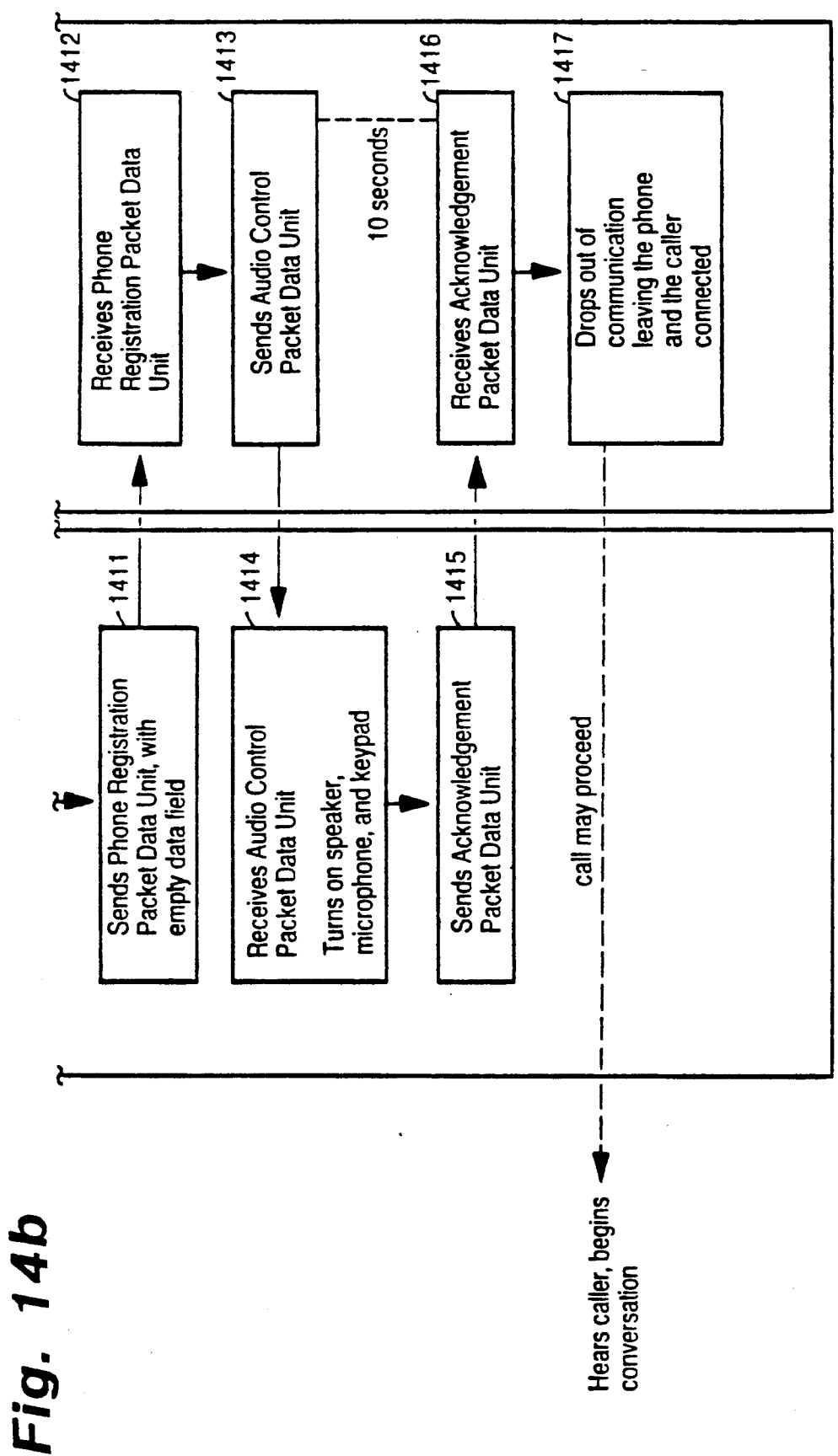

When a customer's calls are connected and rated through the Indirect System 303, connection of incoming calls requires PDU transmission. This transmission is illustrated in FIGS. 14a and 14b. The call comes in for the customer, state 1400, and the Indirect System 303 receives the call, state 1401. The Indirect System 303 determines the destination of the call and establishes a connection with the mobile telephone unit 100 to which the call is going, state 1402. The mobile telephone unit 100 rings, state 1403. When the customer picks up the handset 203 or presses the send (SND) key, the mobile telephone unit 100 waits for a Synchronize PDU, state 1404.

The Indirect System 303 sends the Synchronize PDU, state 1405, to the mobile telephone unit 100. The mobile telephone unit 100 receives the Synchronize PDU, state 1406, and sends the Connect Request PDU, state 1407, to the Indirect System 303. If the Indirect System 303 does not receive the Connect Request PDU within 10 seconds of transmission of the Synchronize PDU, state 1405, the Indirect System 303 sends the Synchronize PDU, state 1405 again, up to two more times.

The Indirect System 303 receives the Connect Request PDU, state 1408, and sends the Connect Confirm PDU, state 1409, to the mobile telephone unit 100. If the mobile telephone unit 100 does not receive the Connect Confirm PDU within 30 seconds of transmission of the Connect Request PDU, state 1407, the mobile telephone unit 100 sends the Connect Request PDU, state 1407 again, up to two more times.

When the mobile telephone unit 100 receives the Connect Confirm PDU, state 1410, it sends the Phone Registration PDU, state 1411, to the Indirect System 303. When the Indirect System 303 receives the Phone Registration PDU, state 1412, it sends an Audio Control PDU, state 1413, to the mobile telephone unit 100. The mobile telephone unit 100 receives the Audio Control PDU and turns on the speaker, microphone, and keypad, state 1414. The mobile telephone unit 303 then sends an Acknowledgement PDU, state 1415, to the Indirect System 303. If the Indirect System 303 does not receive an Acknowledgement PDU within 10 seconds of transmission of the Audio Control PDU, state 1413, the Indirect System 303 sends the Audio Control PDU, state 1413 again, up to two more times.

As soon as the Indirect System 303 receives the Acknowledgement PDU, state 1416, it drops out of communication, leaving the mobile telephone unit 100 and the caller connected, state 1417. The Indirect System 303 rates this call when it is completed.

MOBILE TELEPHONE UNIT CONVERSION

When a vehicle with the installed mobile telephone unit 100 is sold by the rental agency, the mobile telephone unit 100 must be converted in a cellular mobile telephone unit 100 programmed for use outside of the present invention's rental network. To do this, the reseller obtains the Mobile Identification Number (MIN) of the mobile telephone unit 100 to be converted. The Voice Response System 302 is then programmed to flag this MIN as a conversion MIN, e.g. the next time this MIN is sent to the Voice Response System 302, the mobile telephone unit 100 to which it belongs is programmed to identify the mobile telephone unit 100 as owned by the buyer and to be administered accordingly.

Figure 15A:
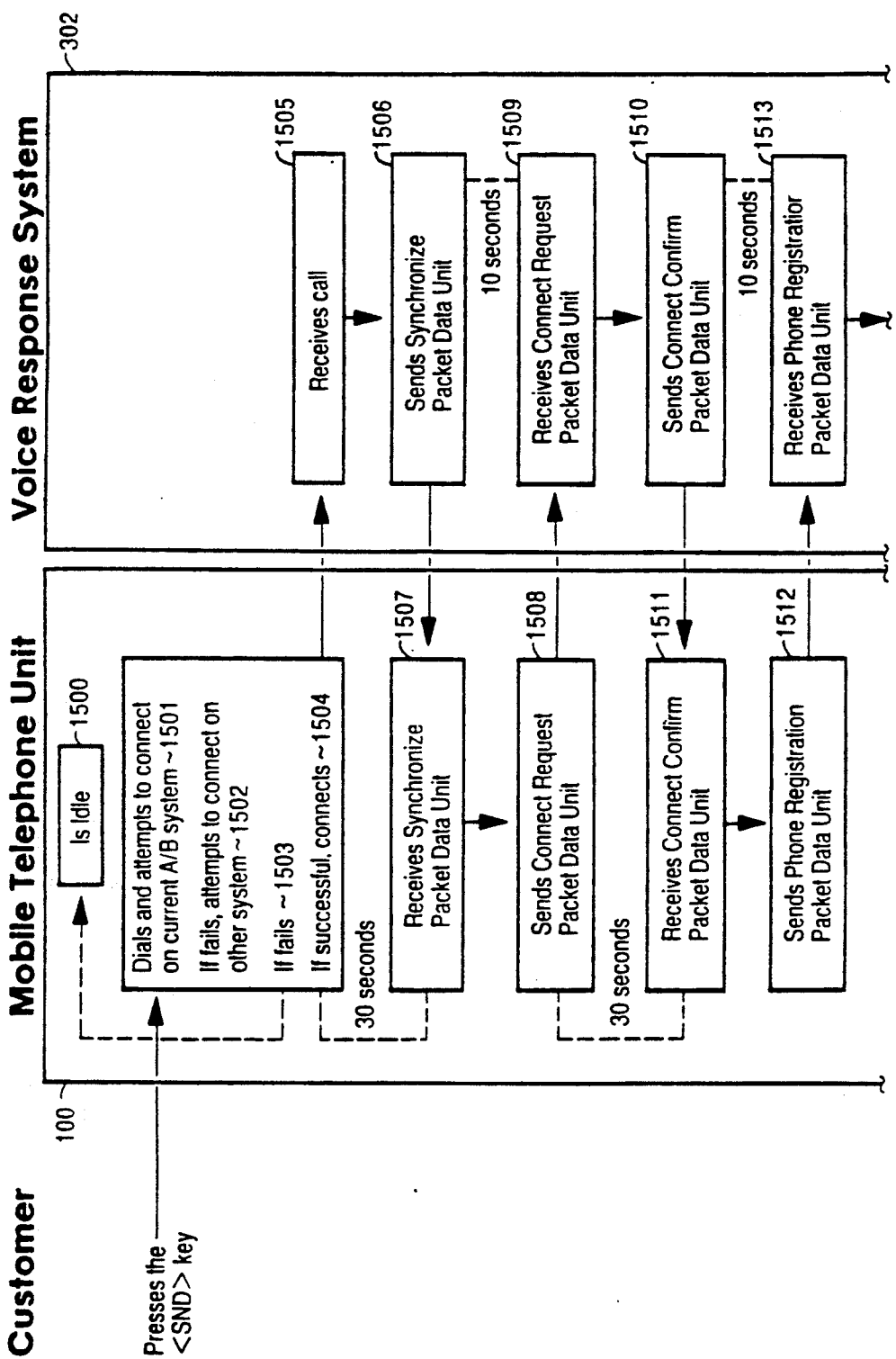
FIGS. 15a and 15b are a composite state transition diagram showing the states and state changes that occur when a mobile telephone unit that is programmed to operate as part of the present invention is converted to a mobile telephone unit programmed for standard cellular use.
Figure 15B:
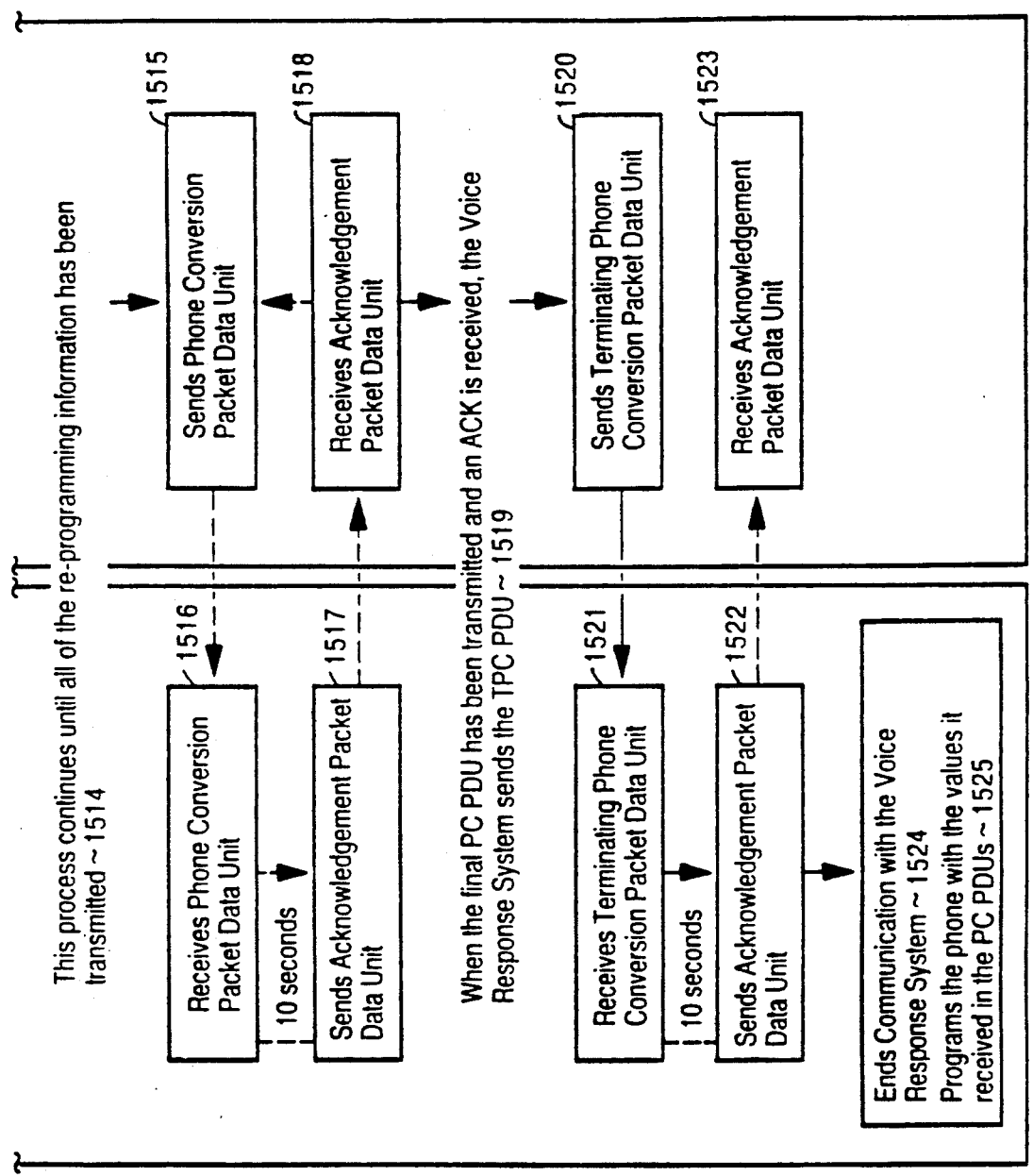

This process is illustrated in FIGS. 15a and 15b. The mobile telephone unit 100 is initially in an idle state 1500. When the Send (SND) key is pressed on the mobile telephone unit 100, the mobile telephone dials and attempts to connect on the current A/B system, state 1501. If this attempt fails, the mobile telephone unit 100 attempts to connect on the opposite system, state 1502. If this attempt also fails, the mobile telephone unit 100 reverts to idle state 1500 until the send (SND) key is pressed again.

When the attempt is successful, the call connects, state 1504, to the Voice Response System 302. The Voice Response System 302 receives the call, state 1505 and sends the Synchronize PDU, state 1506, to the mobile telephone unit 100. If the mobile telephone unit 100 does not receive the Synchronize PDU within 30 seconds of connection, state 1504, a time out occurs which causes the mobile telephone unit 100 to end communication with the Voice Response System 302.

When the mobile telephone unit 100 receives the Synchronize PDU, state 1507, it sends a Connect Request PDU, state 1508, to the Voice Response System 302. If the Voice Response System 302 does not receive the Connect Request PDU within 10 seconds of transmission of the Synchronize PDU, state 1506, the Voice Response System 302 sends the Synchronize PDU, state 1506 again, up to two more times.

After the Voice Response System 302 receives the Connect Request PDU, state 1509, from the mobile telephone unit 100, the Voice Response System 302 sends a Connect Confirm PDU, state 1510, to the mobile telephone unit 100. The mobile telephone unit 100 receives the Connect Confirm PDU, state 1511, and sends the Phone Registration PDU to the Voice Response System 302, state 1512. If the Voice Response System 302 does not receive the Phone Registration PDU within 10 seconds of transmission of the Connect Confirm PDU, state 1510, the Voice Response System 302 sends the Connect Confirm PDU, state 1510 again, up to two more times.

The Voice Response System 302 receives the Phone Registration PDU, state 1513. This Phone Registration PDU contains the MIN of the mobile telephone unit 100, which the Voice Response System 302 recognizes as a conversion MIN. The Voice Response System 302 begins transmitting all the re-programming information the mobile telephone unit 100 needs, state 1514. This process continues as follows until all the re-programming information is transmitted. A Phone Conversion PDU is sent by the Voice Response System 302, state 1515, to the mobile telephone unit 100. The mobile telephone unit 100 receives the Phone Conversion PDU, state 1516, and sends an Acknowledgement PDU, state 1517, to confirm the Phone Conversion PDU was received. If the Voice Response System 302 does not receive an Acknowledgment PDU within 10 seconds of transmission of the Phone Conversion PDU, state 1515, the Voice Response System 302 sends the Phone Conversion PDU, state 1515 again, up to two more times. If the re-programming information is not contained in just one Phone Conversion PDU, this process continues until all of the information is transmitted to the mobile telephone unit.

When all of the re-programming information has been transmitted to the mobile telephone unit 100 through transmission of all Phone Conversion PDUs successfully acknowledged by the mobile telephone unit 100, the final process of conversion begins, state 1519. The Voice Response System sends the Terminating Phone Conversion PDU, state 1520, to the mobile telephone unit 100. The mobile telephone unit 100 receives the Terminating Phone Conversion PDU, state 1521, and sends an Acknowledgement PDU, state 1522 to the Voice Response System 302. If the Voice Response System 302 does not receive an Acknowledgement PDU within 10 seconds of transmission of the Terminating Phone Conversion PDU, state 1520, the Voice Response System 302 sends the Terminating Phone Conversion PDU, state 1520 again, up to two more times.

After sending an Acknowledgement PDU, state 1522, to the Voice Response System 302, the mobile telephone unit 100 ends communication with the Voice Response System 302, state 1524. The mobile telephone unit 100 uses the information it received in each of the Phone Conversion PDUs to program itself with new values that are entered into the NAM (PROM) as described above. These new NAM values enable the mobile telephone unit 100 to operate outside the present invention's rental network.

In summary, the present invention in characterized by a mobile telephone rental system installed in rental vehicles and utilizing a computer system for credit card approval, call monitoring, call rating and billing in real time. Particular embodiments of the said system and the components therein have been illustrated and described. These include, without limitation, the transmission of voice messages through a mobile telephone unit to a customer to obtain credit card information as part of a user registration process; the activation and deactivation of a mobile telephone unit, based on a customer's approved or denied credit; the activation and deactivation of a mobile telephone unit, based on a customer's wishes; the supervision of a mobile telephone unit as it pertains to cellular system identification (SID), mobile telephone unit airtime limits, and operation in cellular service areas outside of the such service; the supervision of incoming calls to a mobile telephone unit; and the billing of a customer's accumulated cellular airtime in real time.

While the foregoing describes certain specific components and features of the preferred embodiments of this invention, further modifications, adaptations, variations, and improvements which include or incorporate the basic underlying principles disclosed will occur to those skilled in the art to which the invention is addressed and are to be considered as within the scope of the invention as defined in the following claims.

What is claimed is:

1. A mobile telephone rental system comprising mobile telephone transceiver units installed in rental vehicles and operated in conjunction with cell sites and cellular switches in mobile telephone switching office (MTSOs) which route calls to and from the mobile telephone units through a public switched telephone network (PSTN) with the system also comprising one or more collectors connected to the one or more cellular switches, a voice response system, and a registration system, such rental system including:

means in the mobile telephone unit for dialing a specific, pre-programmed voice response system;

means in the mobile telephone unit and the voice response system for establishing a bi-directional dual tone modulating frequency (DTMF) communication protocol upon connection of the call between the mobile telephone unit and the voice response system;

means in the mobile telephone unit for transmitting mobile identification number (MIN) and status information to the voice response system;

means for establishing data encryption of DTMF packet data units (PDUs) as well as keyed entry by the user at the unit handset;

means for programming a digital lock code upon command from the voice response system;

means for locking the mobile telephone unit upon command from the voice response system;

means for enabling the voice response system to detect user key presses on the handset upon command from the voice response system;

means for termination of the connection between the mobile telephone unit and the voice response system upon command from the voice response system or the mobile telephone unit;

means for directing the mobile telephone unit to establish radio communication on the A or B Band upon command from the boice response system;

means for directing the mobile telephone unit to contact the voice response system upon entering a new cellular service area;

means for allowing the mobile telephone unit to make calls; and means for unlocking the mobile telephone unit upon entry of a valid digital lock code by user key pressed entry at the handset.

2. A mobile telephone rental system in accordance with claim 1, further including means for programming speed dial positions in the mobile telephone unit from the voice response system.

3. A mobile telephone rental system in accordance with claim 1, further including means for programming NAM bit positions in the mobile telephone unit upon command from the voice response system.

4. A mobile telephone rental system in accordance with claim 1, further including means for setting an airtime meter level and resetting the airtime meter in the mobile telephone unit upon command from the voice response system.

5. A mobile telephone rental system in accordance with claim 1, further including means for directing the mobile telephone unit to contact to contact the voice response system upon reaching a specific airtime meter level.

6. A mobile telephone rental system in accordance with claim 1, further including means for directing incoming and outgoing calls through an indirect system connected to a public branch exchange (PBX) with access to the PSTN upon command from the voice response system.

7. A mobile telephone rental system in accordance with claim 1, wherein the mobile telephone unit and the voice response system accomplish a registration process, with the voice response system including;

means to identify and validate the mobile telephone unit for rental use;

means for reading the credit card number and expiration date from key presses entered by the user at the handset;

means for validating the open credit on the credit card through direct inquiry by the registration system;

means for locking the mobile telephone unit upon a credit decline from the credit card clearinghouse;

means for reading a digital lock code from the key presses entered by the user and programming the lock code in the mobile telephone unit;

means for allowing calls to be placed from and received by the mobile telephone unit when the user has unlocked the mobile telephone unit;

means for supervising the registration process;

means for communicating with the mobile telephone unit for programming purposes;

means for sending voice messages through the mobile telephone unit during the registration process; and means for communicating with the registration system for remote programming of the mobile telephone unit.

8. A mobile telephone rental system in accordance with claim 1, further including means for detecting errors in said bi-directional dual tone modulating frequency (DTMF) communications protocol.

* * * * *